US010856335B2

(12) United States Patent
Uchiyama et al.

(10) Patent No.: US 10,856,335 B2
(45) Date of Patent: Dec. 1, 2020

(54) BASE STATION, TERMINAL DEVICE, AND COMMUNICATION METHOD

(71) Applicant: SONY CORPORATION, Tokyo (JP)

(72) Inventors: Hiromasa Uchiyama, Tokyo (JP); Yifu Tang, Kanagawa (JP); Kazuyuki Shimezawa, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/078,570

(22) PCT Filed: Feb. 3, 2017

(86) PCT No.: PCT/JP2017/004021
§ 371 (c)(1),
(2) Date: Aug. 21, 2018

(87) PCT Pub. No.: WO2017/169111
PCT Pub. Date: Oct. 5, 2017

(65) Prior Publication Data
US 2019/0059115 A1    Feb. 21, 2019

(30) Foreign Application Priority Data

Mar. 31, 2016 (JP) .................................. 2016-072095

(51) Int. Cl.
*H04W 74/08* (2009.01)
*H04W 72/04* (2009.01)
(Continued)

(52) U.S. Cl.
CPC ..... *H04W 74/0841* (2013.01); *H04W 56/002* (2013.01); *H04W 72/04* (2013.01);
(Continued)

(58) Field of Classification Search
CPC ............. H04W 72/04; H04W 72/0453; H04W 72/1263; H04W 92/18; H04W 74/0841; H04W 56/002
See application file for complete search history.

(56) References Cited

U.S. PATENT DOCUMENTS

2010/0151876 A1* 6/2010 Park .................... H04W 72/082
455/452.2
2011/0261771 A1    10/2011 Nagata et al.
(Continued)

FOREIGN PATENT DOCUMENTS

JP       2013-232919 A    11/2013
JP       2015-50529 A     3/2015
(Continued)

OTHER PUBLICATIONS

Extended European Search Report dated Feb. 18, 2019 in European Application No. 17773660.0-1215.
(Continued)

*Primary Examiner* — Jianye Wu
(74) *Attorney, Agent, or Firm* — Xsensus, LLP

(57) ABSTRACT

[Object] To provide a mechanism that enables resources to be efficiently utilized in V2X communication.
[Solution] A base station including: a communication unit configured to perform radio communication; and a processing unit configured to allocate resources in semi-persistent scheduling for inter-terminal communication performed between a plurality of terminal devices and perform control such that control information regarding the allocation of the resources is transmitted to the terminal devices via the radio communication.

24 Claims, 30 Drawing Sheets

| V | I | P | H |
|---|---|---|---|
| • Passenger vehicle<br>• Commercial or fleet vehicle<br>• Emergency vehicle<br>• Transit vehicle | • Cellular network<br>• Data centre<br>• Fleet or freight management centre<br>• Traffic management centre<br>• Weather service<br>• Rail operation centre<br>• Parking system<br>• Toll system | • Cyclist<br>• Pedestrian shelter<br>• Motorcycle | • Home network<br>• Garage<br>• Enterprise or dealer networks |

(51) Int. Cl.
*H04W 92/18* (2009.01)
*H04W 56/00* (2009.01)
*H04W 72/12* (2009.01)

(52) U.S. Cl.
CPC ... *H04W 72/0453* (2013.01); *H04W 72/1263* (2013.01); *H04W 92/18* (2013.01)

(56) References Cited

U.S. PATENT DOCUMENTS

| | | | | |
|---|---|---|---|---|
| 2012/0275438 | A1* | 11/2012 | Dai | H04W 72/1289 370/336 |
| 2013/0322413 | A1* | 12/2013 | Pelletier | H04W 72/1289 370/336 |
| 2014/0029471 | A1 | 1/2014 | Tavildar et al. | |
| 2015/0382324 | A1* | 12/2015 | Sheng | H04W 72/02 370/329 |
| 2017/0245313 | A1* | 8/2017 | Kim | H04L 5/0092 |

FOREIGN PATENT DOCUMENTS

| | | |
|---|---|---|
| JP | 2015-529050 A | 10/2015 |
| JP | 2015-231097 A | 12/2015 |
| WO | 2016/028001 A1 | 2/2016 |

OTHER PUBLICATIONS

Notification of Reasons for Refusal dated Mar. 12, 2019 in Japanese Application No. 2018-508489.

International Search Report dated Apr. 25, 2017 in PCT/JP2017/004021 filed Feb. 3, 2017.

3GPP TSG-RAN WG2 Meeting #85, "Resource allocation for D2D communication", ZTE, R2-140693, Feb. 2014 (5 pages).

3GPP TSG RAN WG1 Meeting #82bis, "PC5 enhancements on resource allocation for V2X Services", Sony Corporation, R1-155624, Oct. 2015 (2 pages).

* cited by examiner

FIG. 1
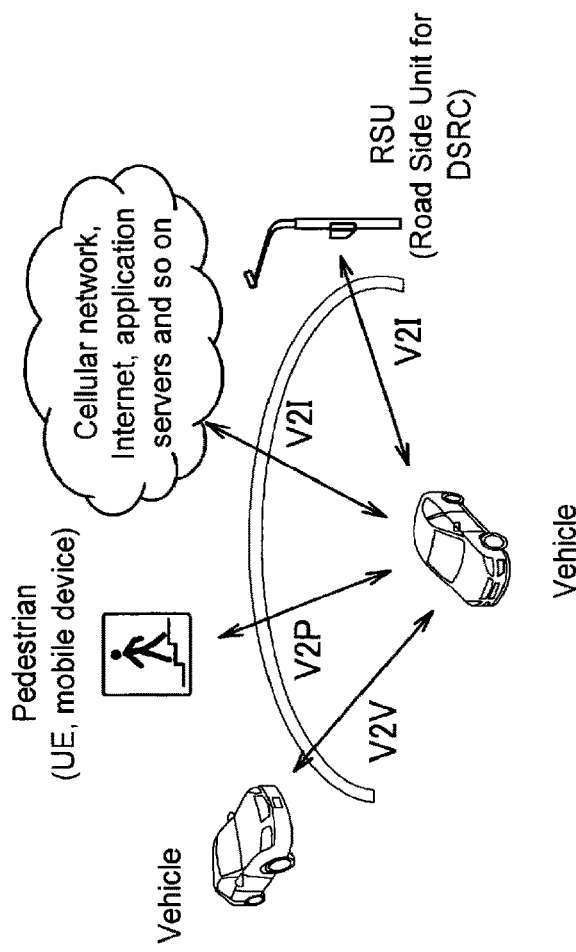
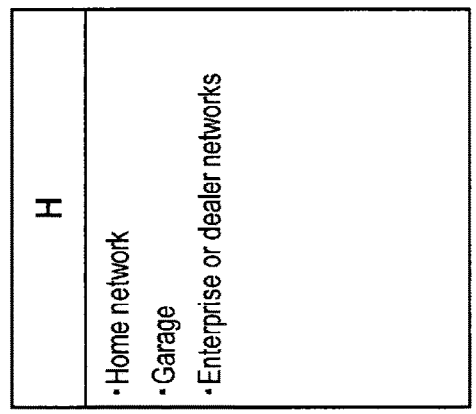
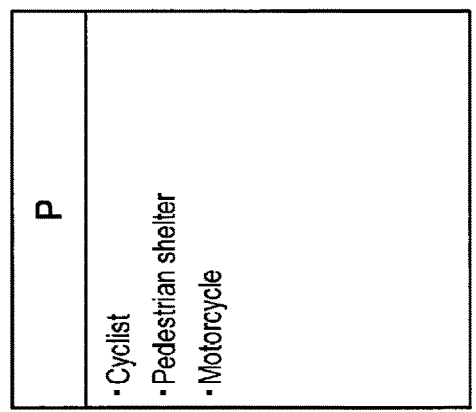
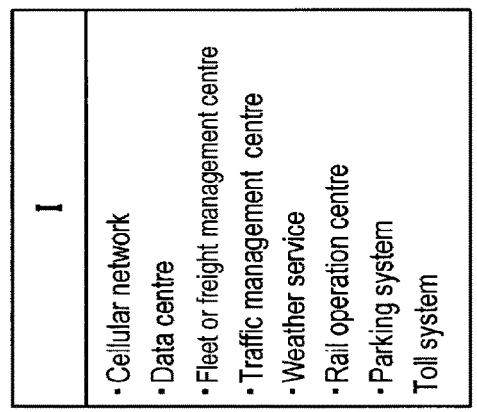
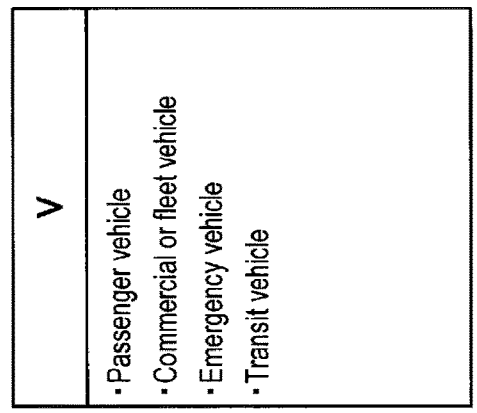

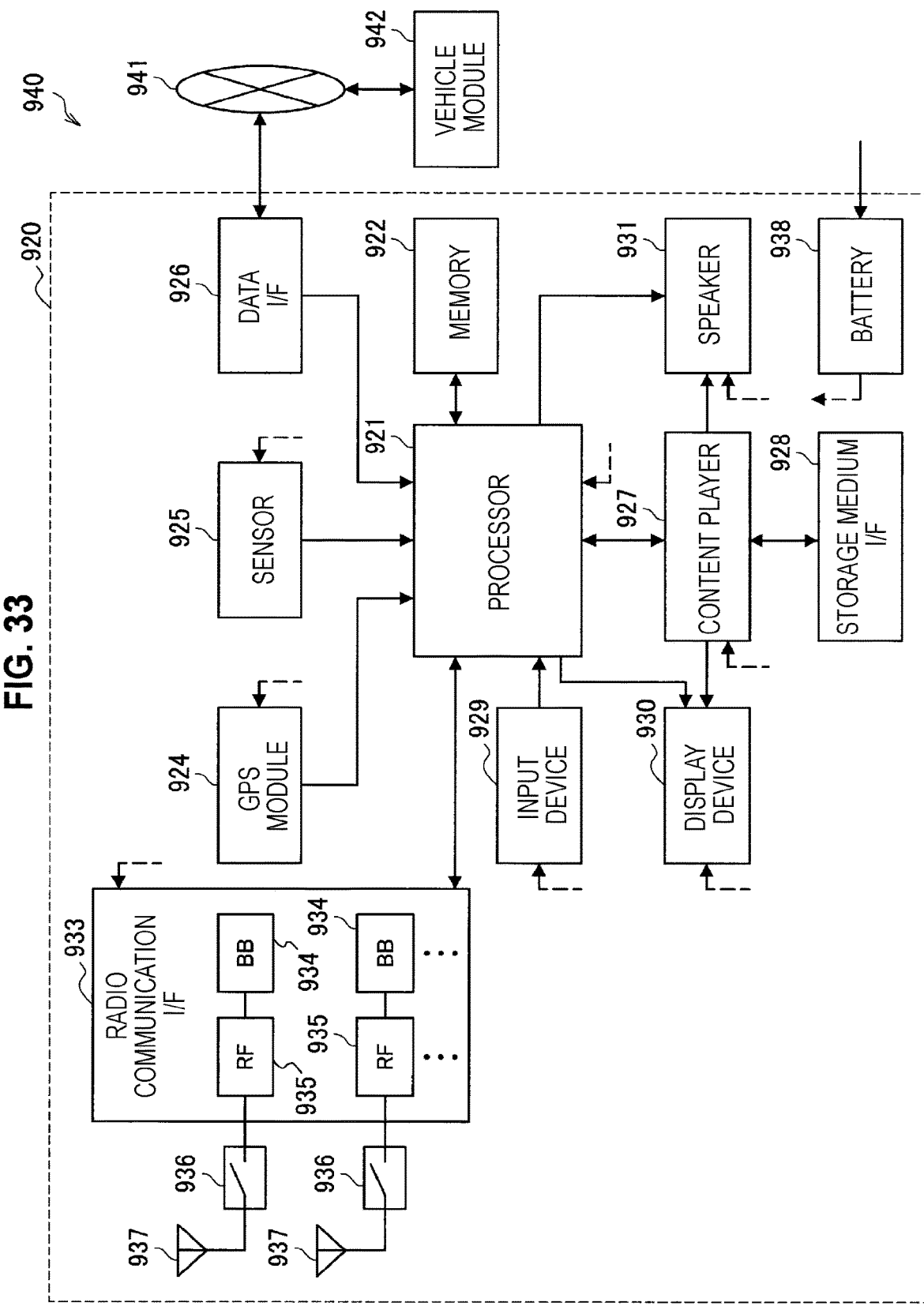

BASE STATION, TERMINAL DEVICE, AND COMMUNICATION METHOD

TECHNICAL FIELD

The present disclosure relates to a base station, a terminal device, and a communication method.

BACKGROUND ART

By utilizing a communication device onboard a mobile object such as a vehicle, direct communication between the mobile object and various target objects is realized. Communication between a communication device onboard a mobile object and various other communication devices is called vehicle-to-X (V2X) communication. For V2X communication, communication systems utilizing dedicated short range communications (DSRC) have been investigated thus far, but recently, investigation into communication systems utilizing mobile phone communication standards such as Long Term Evolution (LTE) is progressing.

Note that investigation of communication between communication devices, which is called device-to-device (D2D), was in progress before active discussion of V2X communication took place. D2D communication is disclosed in, for example, Patent Literature 1.

CITATION LIST

Patent Literature

Patent Literature 1: JP 2015-50529A

Disclosure of Invention

Technical Problem

Meanwhile, the above-described V2X communication tends to accommodate a much larger number of terminals than D2D communication does. For this reason, in V2X communication, introduction of a mechanism that can expand capacities further by efficiently utilizing resources has been demanded.

Therefore, the present disclosure proposes a base station, a terminal device, and a method that enable resources to be efficiently utilized in V2X communication.

Solution to Problem

According to the present disclosure, there is provided a base station including: a communication unit configured to perform radio communication; and a processing unit configured to allocate resources in semi-persistent scheduling for inter-terminal communication performed between a plurality of terminal devices and perform control such that control information regarding the allocation of the resources is transmitted to the terminal devices via the radio communication.

In addition, according to the present disclosure, there is provided a terminal device including: a communication unit configured to perform radio communication; and a processing unit configured to allocate resources in semi-persistent scheduling from a predetermined resource pool for inter-terminal communication performed with another terminal device and perform control such that control information regarding the allocation of the resources is transmitted to the other terminal device via the radio communication.

In addition, according to the present disclosure, there is provided a communication method including: performing radio communication; and allocating resources in semi-persistent scheduling for inter-terminal communication performed between a plurality of terminal devices and performing control such that control information regarding the allocation of the resources is transmitted to the terminal devices via the radio communication.

In addition, according to the present disclosure, there is provided a communication method including: a communication unit configured to perform radio communication; and a processing unit configured to allocate resources in semi-persistent scheduling from a predetermined resource pool for inter-terminal communication performed with another terminal device and perform control such that control information regarding the allocation of the resources is transmitted to the other terminal device via the radio communication.

Advantageous Effects of Invention

According to the present disclosure described above, a base station, a terminal device, and a method that enable resources to be efficiently utilized in V2X communication are provided.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is an explanatory diagram for describing an overview of V2X communication.

FIG. 33 is a block diagram illustrating an example of a schematic configuration of a car navigation device.

MODE(S) FOR CARRYING OUT THE INVENTION

Figure 2:
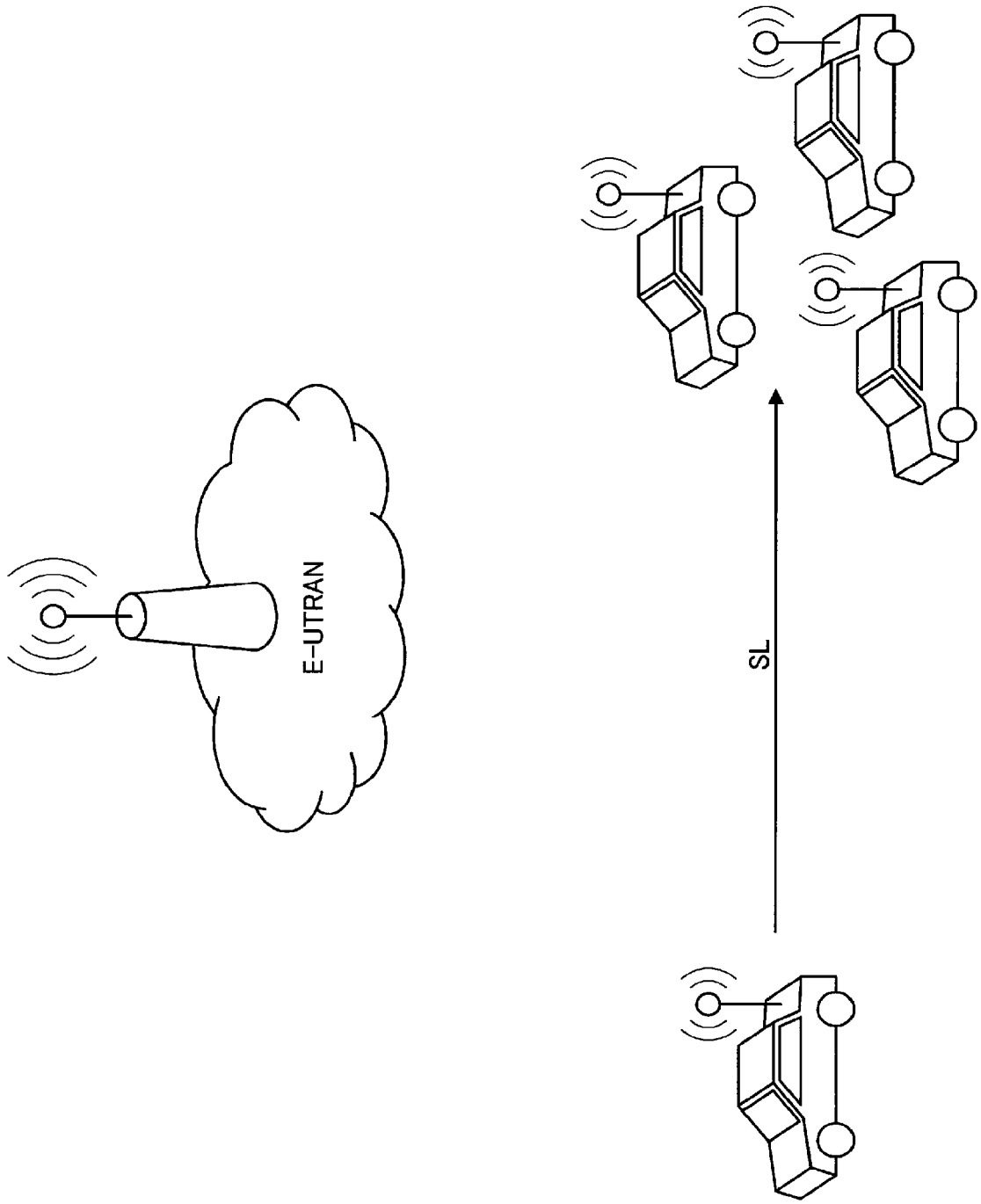
FIG. 2 is an explanatory diagram for describing a first scenario of V2V communication.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. Introduction
1.1. V2X communication
1.2. Technical problems
2. Configuration example
2.1. Configuration example of system
2.2. Configuration example of UE (user terminal)
2.3. Configuration example of UE (mobile object)
2.4. Configuration example of eNB
2.5. Configuration example of RSU
3. Technical features
3.1. Realization of SPS
3.2. Configuration and reconfiguration of SPS
3.3. Control at time of SA decoding failure
3.4. Operation of reception terminal
3.5. Other
4. Application examples
4.1. Application examples with respect to eNB
4.2. Application examples with respect to UE and RSU
5. Conclusion

1. Introduction

1.1. V2X Communication

To realize automated driving in the future, anticipation of direct communication between a mobile object such as a vehicle and various target objects by using a communication device onboard the mobile object has been increasing recently. Such communication between a vehicle and various target objects is called vehicle-to-X (V2X) communication. FIG. 1 is an explanatory diagram for describing an overview of V2X communication. As V2X communication, for example, there are vehicle-to-vehicle (V2V) communication, vehicle-to-infrastructure (V2I) communication, vehicle-to-pedestrian (V2P) communication, and vehicle-to-home (V2H) communication as illustrated in FIG. 1. In addition, although not illustrated, for example, there is also vehicle-to-nomadic-device (V2N) communication as V2X communication. Here, the first letters and the third letters of V2V communication and the like each represent starting points and end points of the communication, and do not limit a communication path. For example, V2V communication is a concept including direct communication between mobile objects and indirect communication via a base station or the like.

As illustrated in FIG. 1, the communication target of a vehicle in V2V communication may be a passenger vehicle, a commercial or fleet vehicle, an emergency vehicle, or a transit vehicle, for example. Also, the communication target of a vehicle in V2I communication may be a cellular network, a data centre, a fleet or freight management centre, a traffic management centre, a weather service, a rail operation centre, a parking system, or a toll system, for example. Also, the communication target of a vehicle in V2P communication may be a cyclist, a pedestrian shelter, or a motorcycle, for example. Also, the communication target of a vehicle in V2H communication may be a home network, a garage, or enterprise or dealer networks, for example.

Note that, as V2X communication, although a communication system in which 802.11p-based dedicated short range communication (DSRC) is used has been mainly investigated so far, discussion about standardization of "LTE-based V2X" that is Long Term Evolution (LTE)-based in-vehicle communication has recently started.

Examples of use cases of V2X communication will be introduced below. Mainly targeting safety (Safety) applications, "Periodical message" transmission of periodically transmitting messages to a vehicle, and communication of an "Event trigger message" for providing necessary information corresponding to an event have been demanded (refer to 3GPP TR 22.885).

(Examples of V2X Use Cases)
1. Forward collision warning
2. Control loss warning
3. V2V use case for emergency vehicle warning
4. V2V emergency stop use case
5. Cooperative adaptive cruise control
6. V2I emergency stop use case
7. Queue warning 8. Road safety services
9. Automated parking system
10. Wrong way driving warning
11. V2V message transfer under operator control
12. Pre-crash sensing warning
13. V2X in areas outside network coverage
14. V2X road safety service via infrastructure
15. V2I/V2N traffic flow optimization
16. Curve speed warning
17. Warning to pedestrian against pedestrian collision
18. Vulnerable road user (VRU) safety
19. V2X by UE type RSU
20. V2X minimum QoS
21. Use case for V2X access when roaming
22. Pedestrian road safety via V2P awareness messages
23. Mixed use traffic management
24. Enhancing positional precision for traffic participants In addition, examples of requirements for the above-described use cases are shown in the following Table 1.

TABLE 1

Examples of performance in V2X communication

| | Effective range | Absolute velocity of a UE supporting V2X Services | Relative velocity between 2 UEs supporting V2X Services | Maximum tolerable latency | Minimum radio layer message reception reliability (probability that the recipient gets it within 100 ms) | Example Cumulative transmission reliability |
|---|---|---|---|---|---|---|
| #1 (suburban) | 200 m | 50 kmph | 100 kmph | 100 ms | 90% | 99% |
| #2 (freeway) | 320 m | 160 kmph | 280 kmph | 100 ms | 80% | 96% |
| #3 (autobahn) | 320 m | 280 kmph | 280 kmph | 100 ms | 80% | 96% |
| #4 (NLOS/urban) | 150 m | 50 kmph | 100 kmph | 100 ms | 90% | 99% |
| #5 (urban intersection) | 50 m | 50 kmph | 100 kmph | 100 ms | 95% | — |
| #6 (campus/shopping area) | 50 m | 30 kmph | 30 kmph | 100 ms | 90% | 99% |

(Physical Layer)

In order to satisfy the above-described requirements, standardization of physical layers of V2X communication has already started in 3GPP, and beginning from the standardization of V2V communication that is inter-vehicle communication, V2I/N and V2P communication have been standardized.

As a base technology of V2X communication, device-to-device (D2D) communication that was standardized in the past in 3GPP is exemplified. Since D2D communication is inter-terminal communication that does not go through a base station, it is considered that D2D communication can be enhanced to be adaptive to V2V communication and V2P communication (it can also be partly adaptive to V2I communication). An interface between such terminals is called a PC5 interface. In addition, enhancing conventional communication between a base station and a terminal to be adaptive to V2I communication and V2N communication has already been considered. Such an interface between a base station and a terminal is called a Un interface.

In order to realize such V2X communication, it is necessary to enhance a PC5 interface or a Un interface to satisfy the requirements.

Principal enhancement points are as follows.
(Examples of Enhancements)
  Improvement in resource allocation
  Countermeasure to Doppler frequency
  Establishment of synchronization method
  Realization of low power consumption communication
  Realization of low latency communication etc.

Various operation scenarios of V2X communication will be considered. As examples, examples of operation scenarios of V2V communication will be described with reference to FIGS. 2 to 6.

FIG. 2 is an explanatory diagram for describing a first scenario of V2V communication. In the first scenario, mobile objects such as vehicles perform direct V2V communication. A communication link of this case is also called sidelink (SL).

Figure 3:
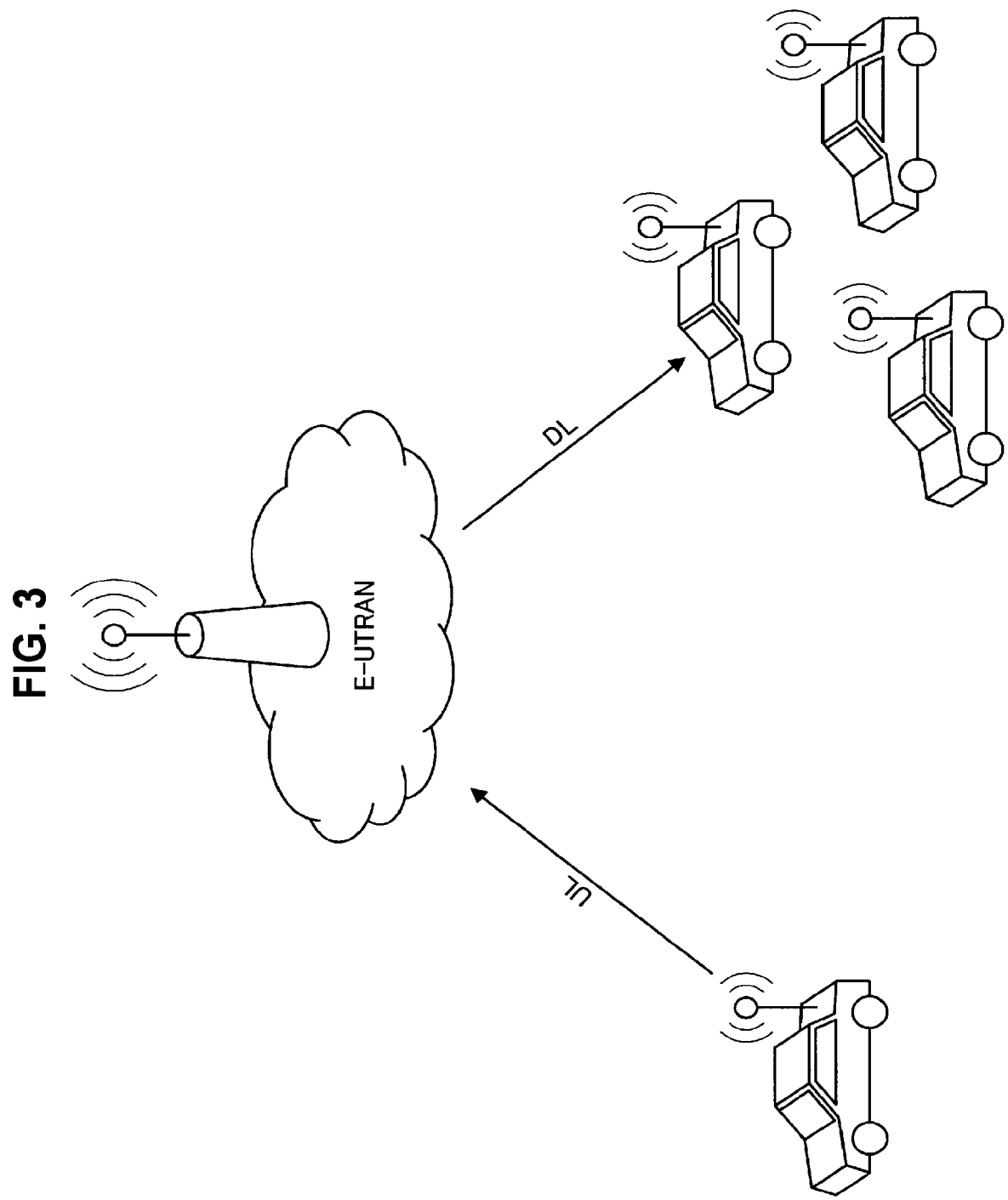
FIG. 3 is an explanatory diagram for describing a second scenario of V2V communication.

FIG. 3 is an explanatory diagram for describing a second scenario of V2V communication. In the second scenario, mobile objects such as vehicles perform indirect V2V communication via an evolved universal terrestrial radio access (E-UTRAN), i.e., via a base station. A communication link from a transmission side to the base station is also called uplink (UL), and a communication link from the base station to a reception side is also called downlink (DL).

Figure 4:
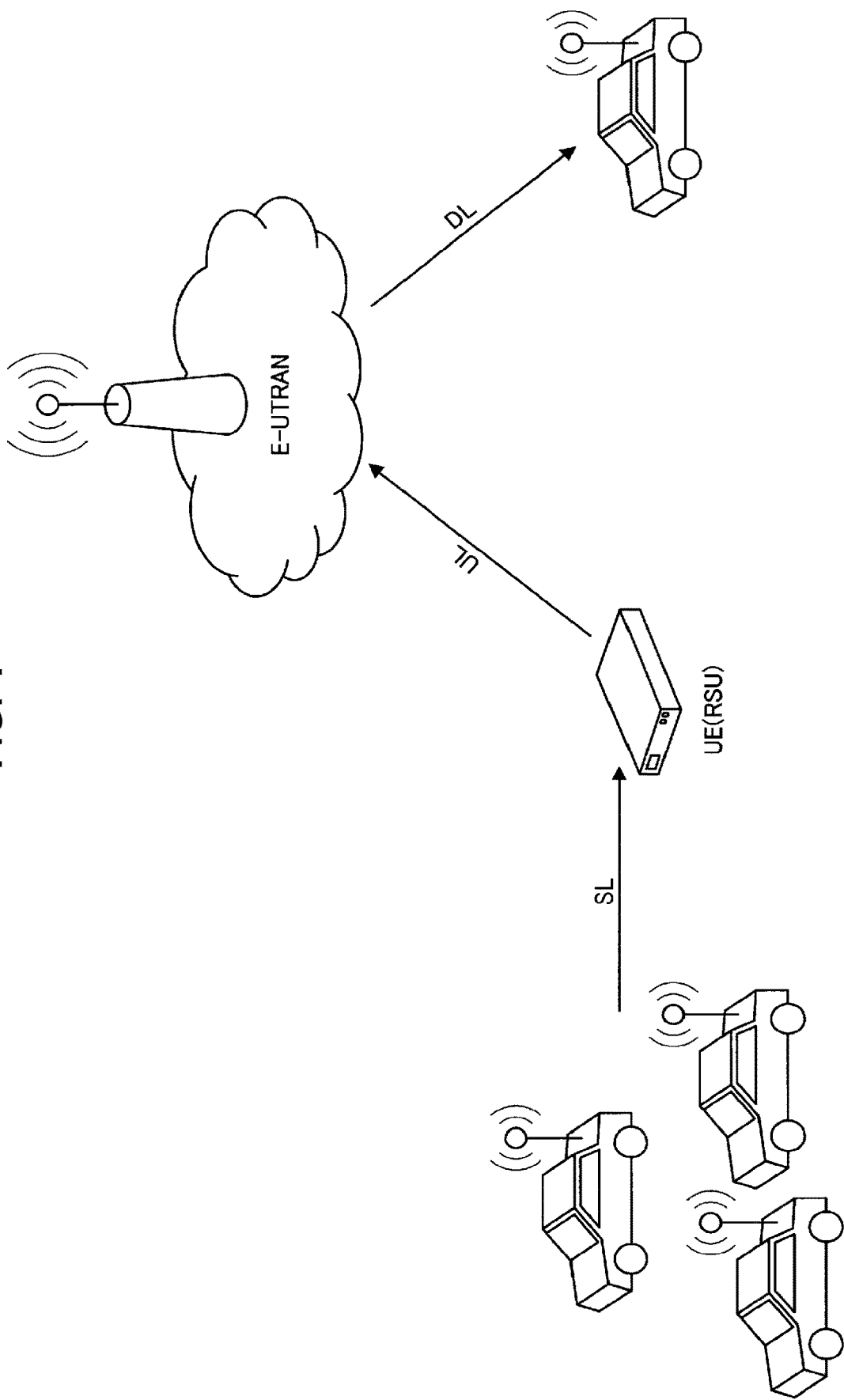
FIG. 4 is an explanatory diagram for describing a third scenario of V2V communication.

FIG. 4 is an explanatory diagram for describing a third scenario of V2V communication. In the third scenario, mobile objects such as vehicles transmit signals to another mobile object via an RSU or RSU-type UE and the E-UTRAN in order. Communication links between the devices each are SL, UL, and DL in order.

Figure 5:
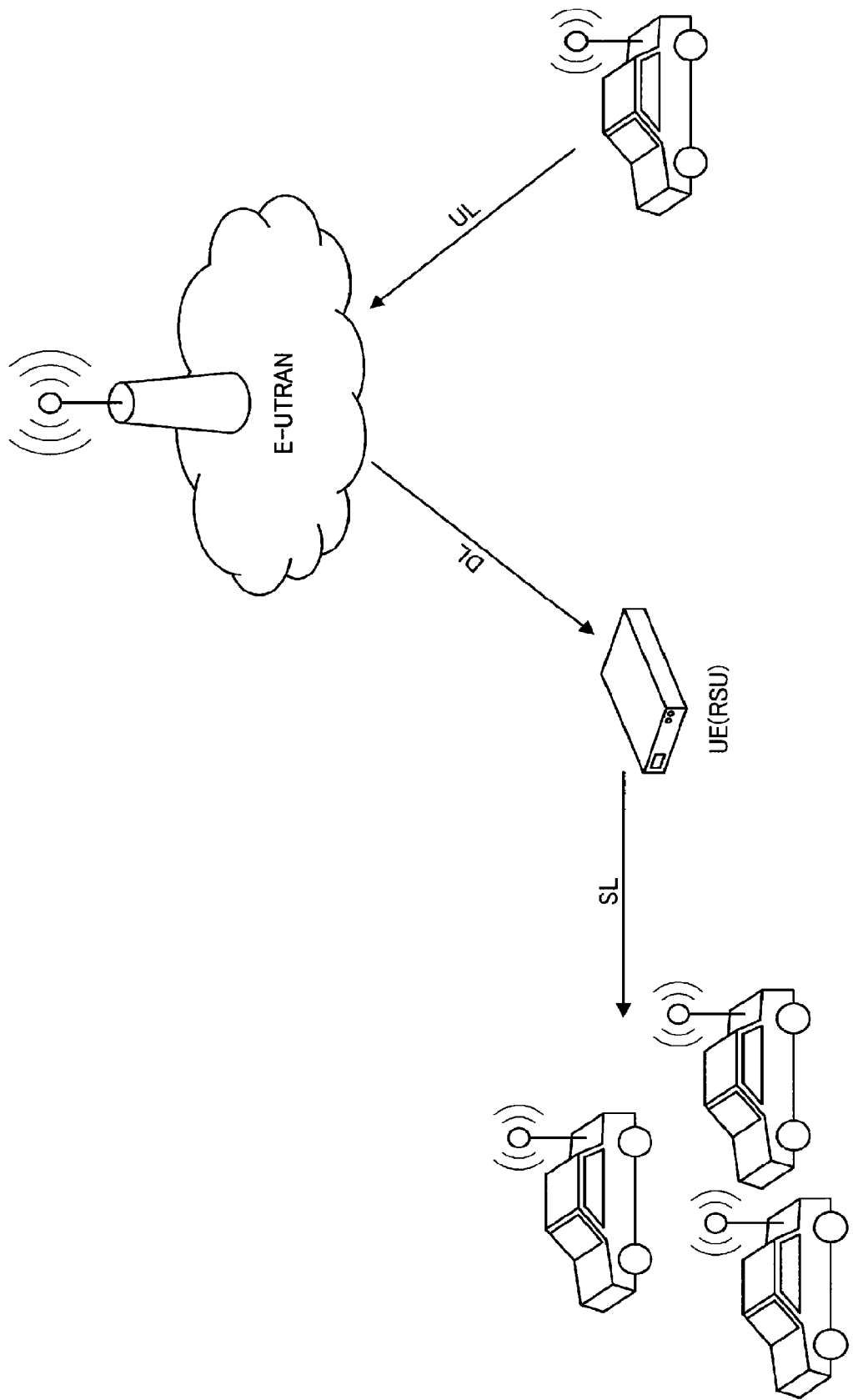
FIG. 5 is an explanatory diagram for describing a fourth scenario of V2V communication.

FIG. 5 is an explanatory diagram for describing a fourth scenario of V2V communication. In the fourth scenario, mobile objects such as vehicles transmit a signal to another mobile object via the E-UTRAN and an RSU or RSU-type UE in order. Communication links between the devices each are UL, DL, and SL in order.

Figure 6:
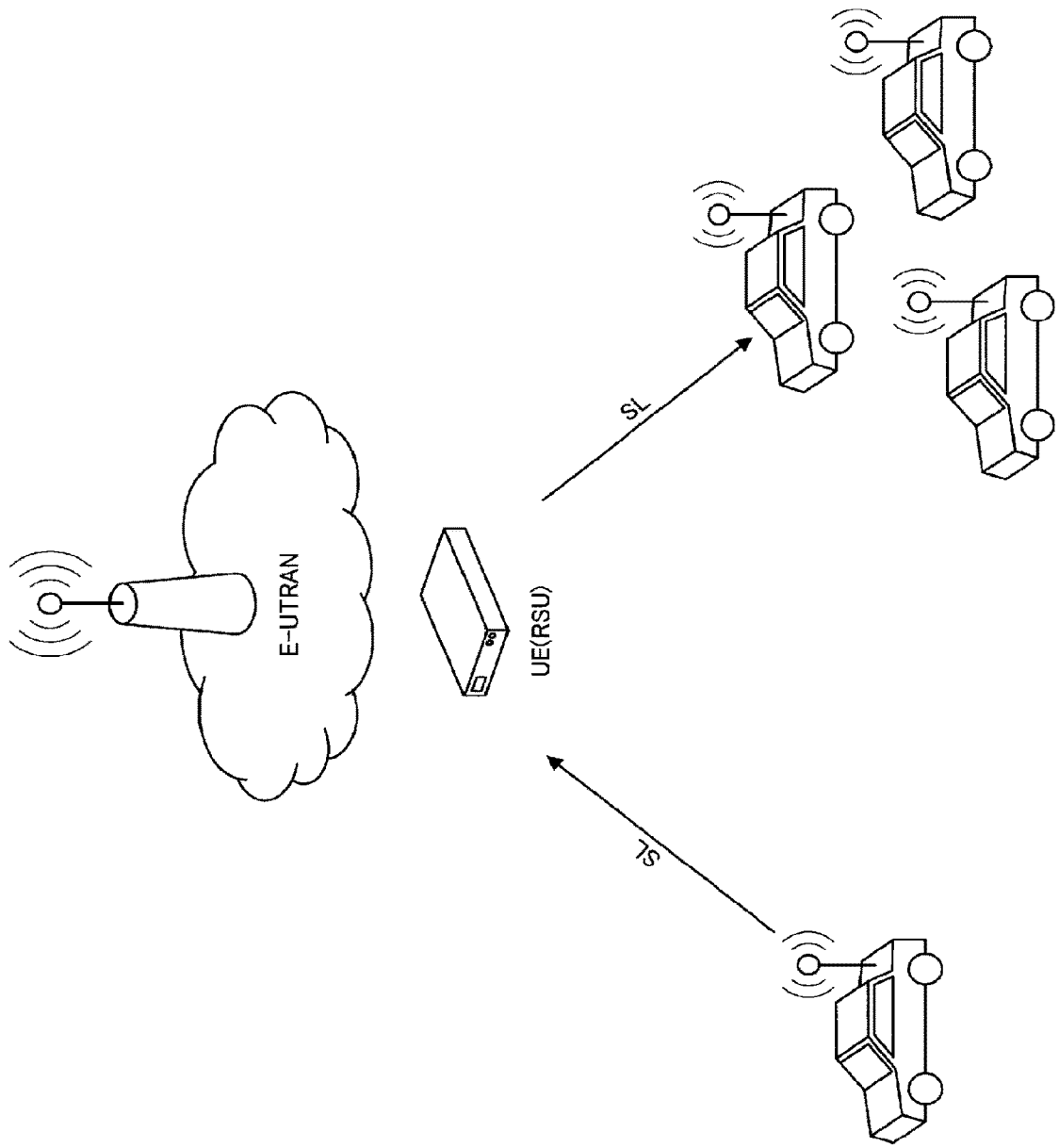
FIG. 6 is an explanatory diagram for describing a fifth scenario of V2V communication.

FIG. 6 is an explanatory diagram for describing a fifth scenario of V2V communication. In the fifth scenario, mobile objects such as vehicles perform indirect V2V communication via an RSU or RSU-type UE. Communication links between the mobile objects and the RSU or the RSU-type UE are SL.

Each of the scenarios described above turns into a scenario of V2P communication if the mobile objects of one side are replaced with pedestrians. Likewise, each of the scenarios turns into a scenario of V2I communication or V2N communication if the mobile objects of one side are replaced with infrastructure or a network respectively.

1.2. Technical Problems

Next, technical problems of the present embodiment will be described. Note that, in the present disclosure, a method of resource allocation in V2X communication will be focused on. Since V2X communication differs in requirements, communication environments, and the like from D2D communication, it is difficult to use conventional D2D communication without change. Thus, it is necessary to enhance D2D communication to be adaptive to V2X communication. Differences in features of D2D communication and V2X communication will be described below.

- Feature 1: V2X communication requires high reliability and needs low latency communication.
- Feature 2: V2X-specific traffic exists.
- Feature 3: V2X has various links.
- Feature 4: In-band emission (IBE) problem.
- Feature 5: Half duplex (HD) problem.
- Feature 6: Problem of a larger capacity (Capacity) than in D2D
- Feature 7: Position information is obtained at all times.

First, feature 1 is obvious from a V2X communication use case. V2X communication is mostly for safety (Safety) applications, and thus reliability is a very important index. In addition, since movement speeds of cars are faster than walking in a D2D use case, realization of low latency communication is necessary.

With regard to the traffic indicated in feature 2, two types of traffic mainly including "Periodic traffic" and "Event trigger traffic" are assumed in V2X communication. "Periodic traffic" is communication of periodically reporting data to peripheral vehicles, and this is also a feature of V2X.

As the links described in feature 3, V/I/N/P are assumed as communication targets of a car in V2X communication. Having such various links is also a unique point of V2X communication.

Figure 7:
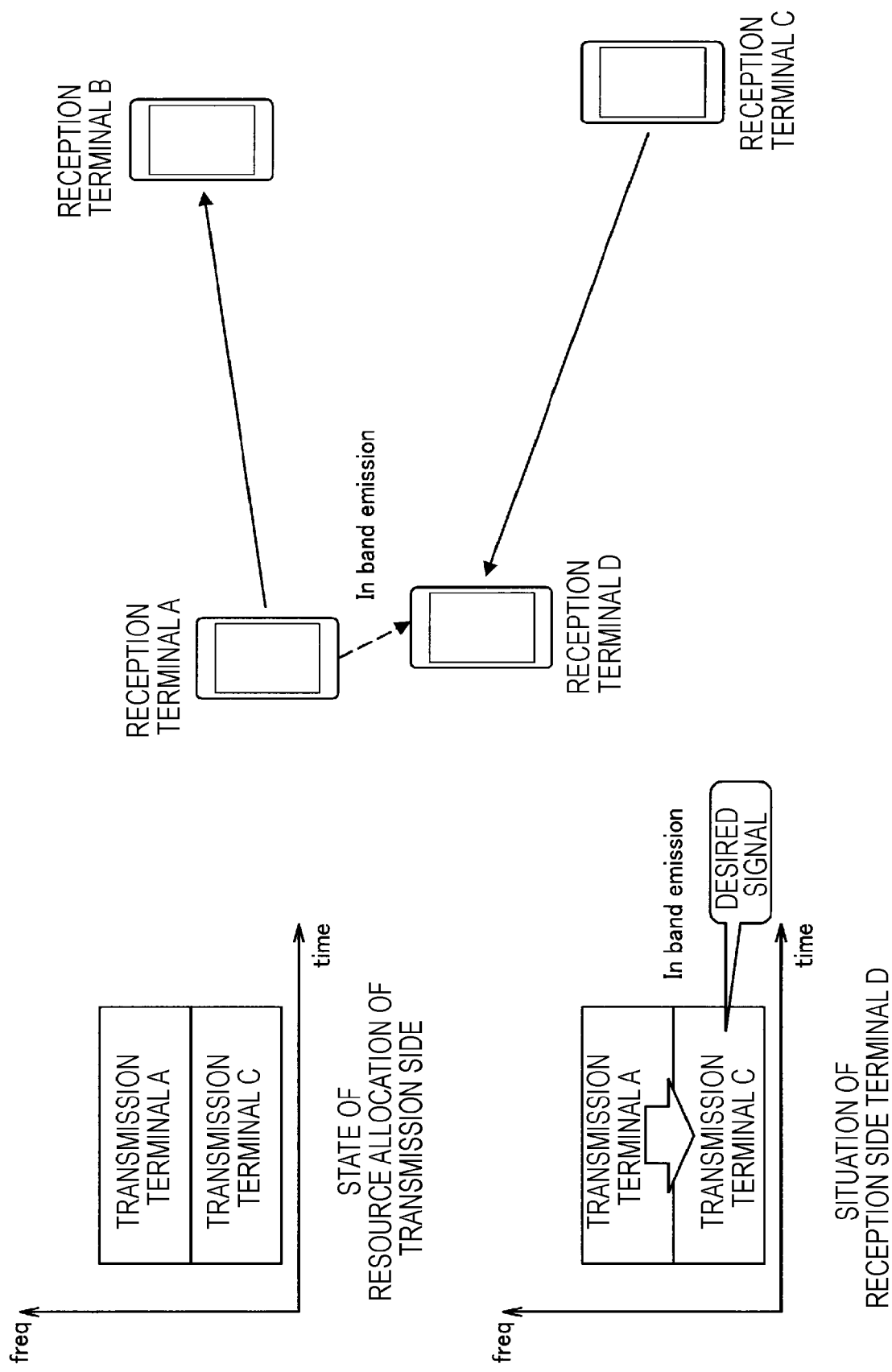
FIG. 7 is an explanatory diagram for describing IBE.

The IBE/HD problems described in feature 4 are related to topology of terminals and radio frequency (RF) performance. First, IBE will be described using FIG. 7. FIG. 7 is an explanatory diagram for describing IBE. In V2V communication, a positional relationship between transmission and reception terminals changes at all times, unlike in base station-terminal communication. In a case in which a reception terminal is in the vicinity of a transmission terminal, there are cases in which emission (Emission) from the transmission side affects the nearby reception terminal. Although orthogonality is maintained on a frequency axis, influence of IBE becomes remarkable as a distance between transmission and reception terminals become closer. The diagram illustrates a state in which a terminal A gives IBE to a terminal D. In such a case in which a distance between transmission and reception terminals is close, there is a possibility of interference with resources of an adjacent frequency occurring. This problem, however, can also arise in D2D. However, in V2X communication in which a larger number of terminals communicate than in D2D, the IBE problem becomes more noticeable.

The HD problem described in feature 5 represents a problem of a difficulty for a terminal to perform reception when the terminal performs transmission. Thus, in V2X communication, measures of "preparing a plurality of reception opportunities," "not allocating a frame in which data is being transmitted for transmission of another user," and the like are necessary. Although the HD problem is not unique to V2X, the problem may be a significant constraint to V2X communication in which many transmission and reception operations need to be performed.

Next, capacity (Capacity) described in feature 6 will be described. As described above, V2X communication accommodates a much larger number of terminals than D2D communication does. Furthermore, since vehicles run on roads, a local density of terminals unavoidably increases. Thus, in V2X communication, improvement in capacity (Capacity) is vital. It is necessary to delete as much unnecessary overhead or the like as possible and to realize efficient communication.

In addition, regarding feature 7, as is obvious from the recent mounting percentage of navigation devices in vehicles, vehicles are assumed to ascertain their own position information at all times. Such position information is a very important feature to enhance V2X communication.

Figure 8:
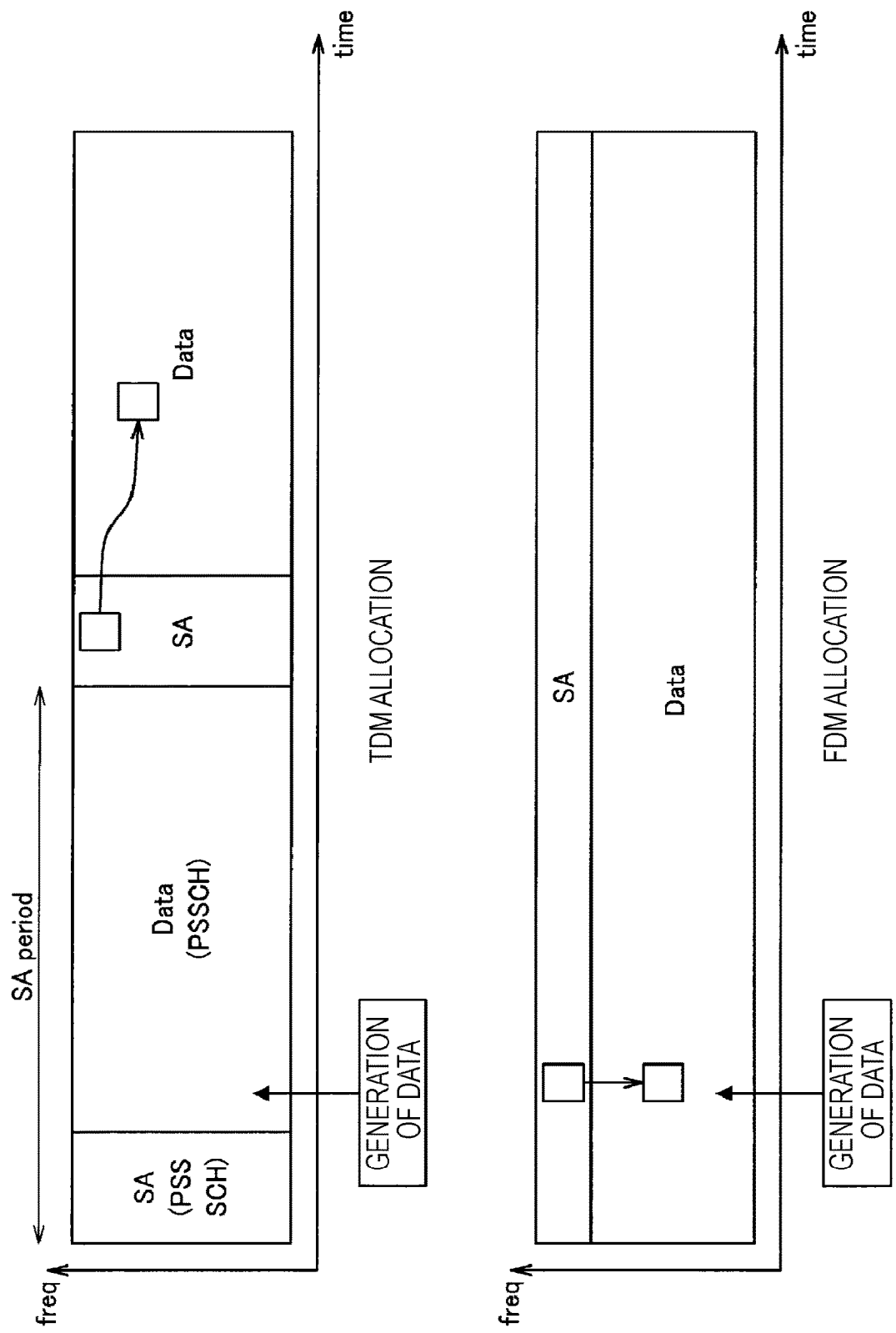
FIG. 8 is an explanatory diagram for describing resource allocation methods in each of TDM and FDM.

In order to solve the problems, 3GPP is currently investigating a method of resource allocation using frequency division multiplexing (FDM). Time division multiplexing (TDM) allocation and FDM allocation will be described using FIG. 8. FIG. 8 is an explanatory diagram for describing resource allocation methods in each of TDM and FDM. A PC5 interface on which D2D communication and V2X communication are performed mainly includes a control channel unit (Physical Sidelink Control CHannel or PSCCH) and a data channel unit (Physical Sidelink Shared CHannel or PSSCH). There is a problem of an increasing delay from the generation to transmission of packets in the TDM method to report a PSSCH resource instruction or the like on a PSCCH. On the other hand, the TDM method has an advantage that terminal complexity (Complexity) is good. Note that D2D adopts the TDM allocation method. On the other hand, since PSCCHs are mapped in a frequency direction in the FDM method, delays are less of a problem. In addition, by transmitting control information (Scheduling Assignment or SA) and data (Data) in the same subframe (SF), improvements with regard to the IBE and HD problems can also be expected. Thus, establishment of a communication method using the FDM method in V2X communication has been demanded.

Note that, for reference, it is assumed in V2X communication that each of SA and Data is repeatedly transmitted a plurality of times (Repetition). This is because ACK/NACK are not supported in D2D, and such repetition (Repetition) is introduced to reliably deliver data to a terminal.

Figure 9:
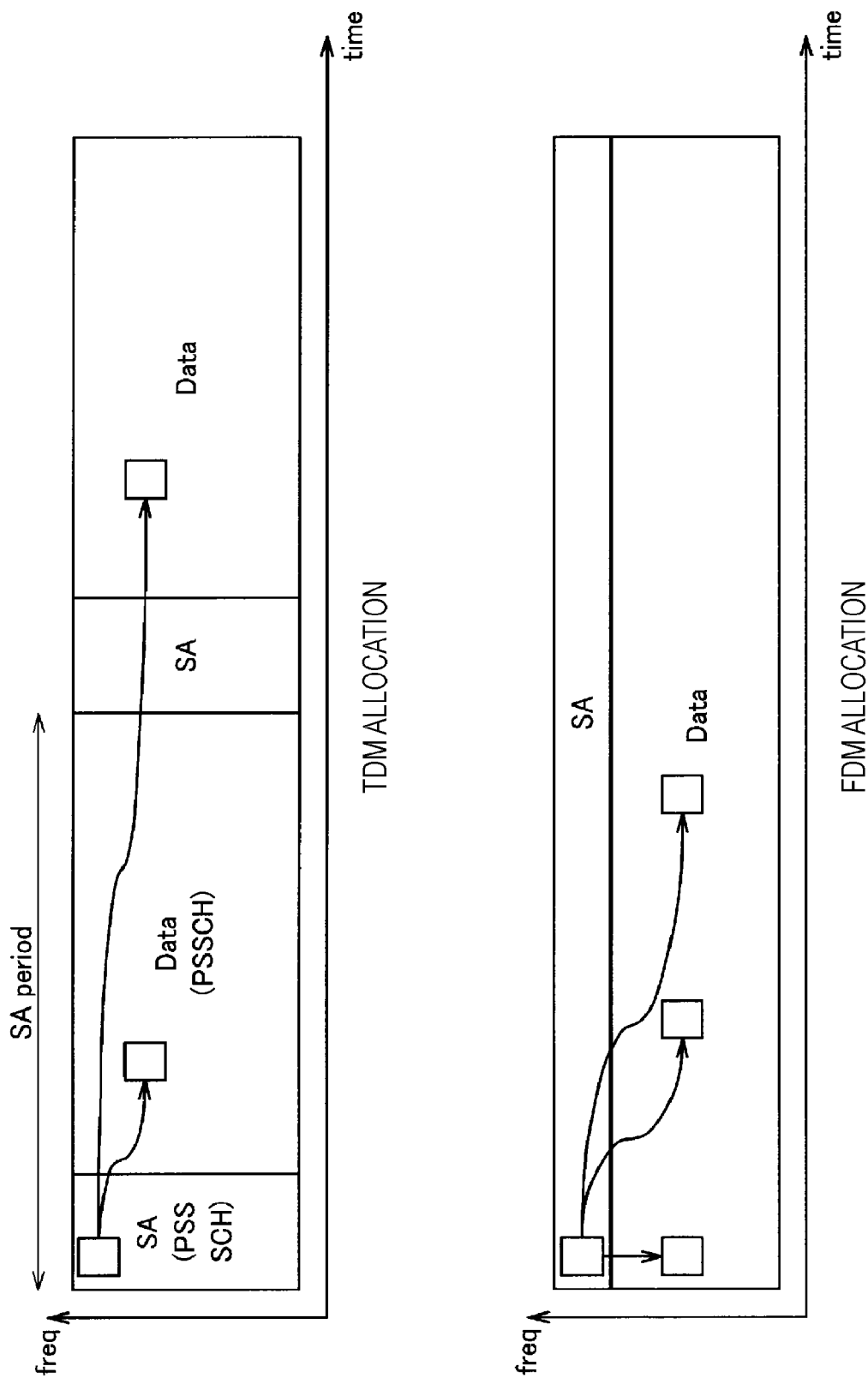
FIG. 9 is an explanatory diagram for describing an overview of SPS.

Addition of further enhancements in addition to the FDM method has also been investigated. In order to solve the above-described capacity problem of feature 6, introduction of semi-persistent scheduling (SPS) has also been investigated currently. SPS makes good use of the characteristics of the traffic types (feature 2) having features in V2X communication. An overview of SPS is introduced in FIG. 9. FIG. 9 is an explanatory diagram for describing an overview of SPS. In SPS, a plurality of pieces of data are subject to scheduling with one SA. For this reason, it is not necessary to transmit SAs with each data transmission, and overhead can be reduced. In particular, in periodic communication like Periodical traffic of V2X, it has been ascertained that such scheduling brings a significant effect. Thus, introduction of SPS into V2X communication has also been demanded.

Next, an enhancement using position information will be described. As described in feature 6, capacities in V2X communication are a big problem. Thus, space reuse of frequency resources has been investigated. Position information of vehicles described in feature 7 is utilized in space reuse. The enhancement using position information is also currently being discussed in 3GPP.

So far, the overview of the enhancements of the PC5 interface has been described. In V2X communication, there are two kinds of resource allocation methods including "Centralized resource allocation" of Mode 1 and "Autonomous resource selection" of Mode 2. In the case of Mode 1, a base station performs total resource allocation of the PC5 interface. A terminal side may only perform transmission using resources instructed by the base station. Although the overhead between the base station and the terminal is a concern, communication characteristics are good because resources are allocated orthogonally. On the other hand, in Mode 2, a terminal autonomously selects resources to be used in transmission from a resource pool reported from a base station. Although there is no concern of overhead in Mode 1, there is a possibility of selecting the same resources as other terminals, and thus there is a possibility of an explicit collision (Collision) problem. Mode 2 also has an advantage in that operations can be performed not only in-coverage (In-coverage) but also out-of-coverage (Out-of-coverage) within a network (Network) of a base station.

There are several suggestions being made at present to deal with the collision (Collision) problem of Mode 2. Solutions (Solution) thereto are broadly divided into two. One of them is "Energy sensing." "Energy sensing" is a method of sensing resources for a certain period and selecting communication resources from resources that are relatively unused on the basis of the sensing result. While this method is simple, the accuracy thereof is not that high in view of a power level. The other method is "SA decoding." This is a method of decoding SA (control information) transmitted by another user and recognizing a location of resources being used. While resources being used can be found with high accuracy in that method, there is a disadvantage that sensing of the SA resources itself is hard to perform, or the like.

Finally, the list of the enhancements described so far is shown below as Table 2. The list is an example, describing representative enhancements, and various other methods are being investigated.

TABLE 2

List of enhancements
Enhancement

FDM
SPS
Geo-location
Sensing (Energy sensing/SA decoding)

2. Configuration Example

A configuration example of a radio communication system shared by the embodiments will be described below.

2.1. Configuration Example of System

Figure 10:
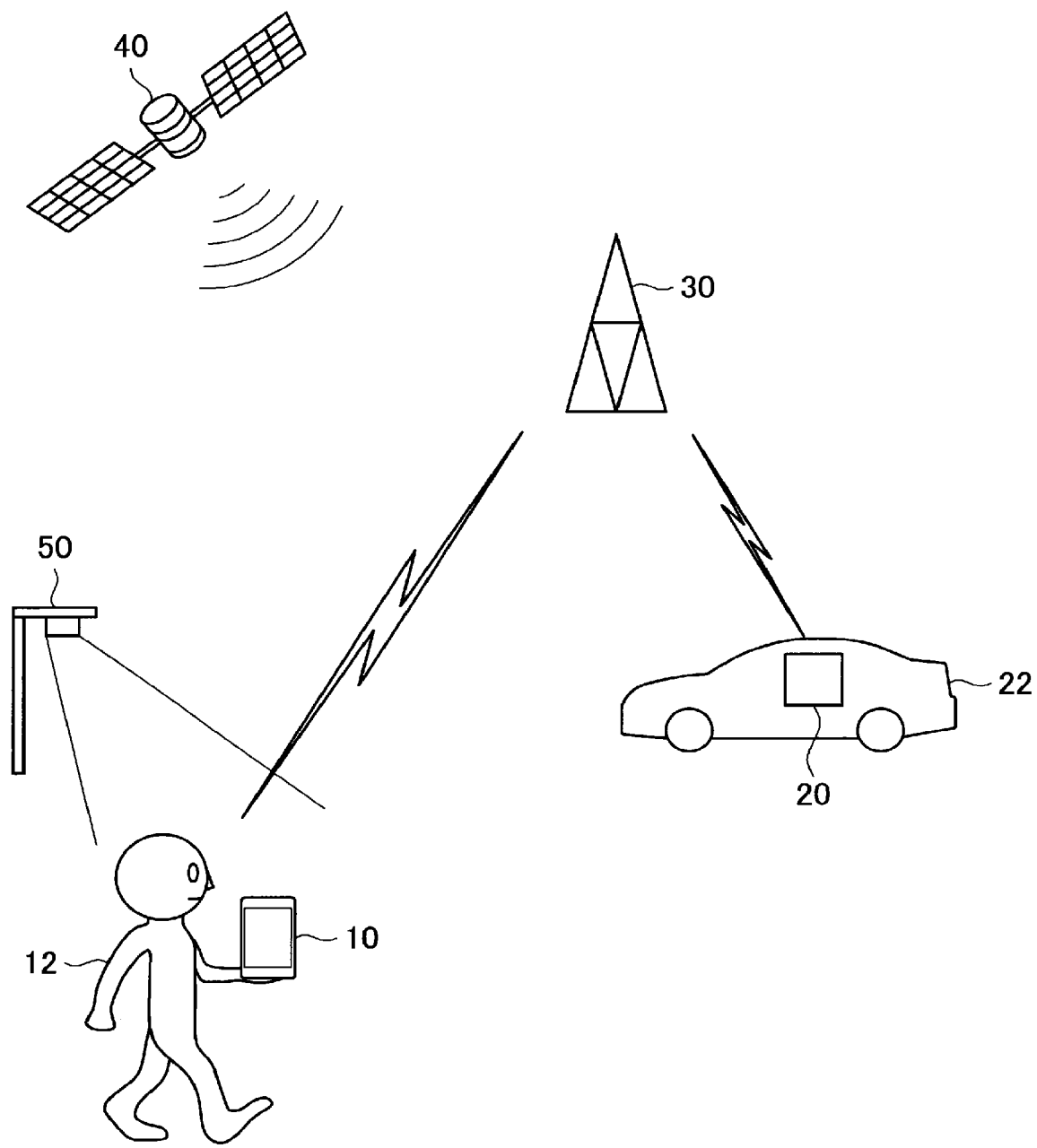
FIG. 10 is an explanatory diagram illustrating a configuration of a radio communication system according to an embodiment of the present disclosure.

FIG. 10 is an explanatory diagram illustrating a configuration of a radio communication system according to an embodiment of the present disclosure. As illustrated in FIG. 10, the radio communication system according to an embodiment of the present disclosure includes a UE 10, a UE 20, a vehicle 22, an eNB 30, a GNSS satellite 40, and an RSU 50.

The eNB 30 is a cellular base station that provides a cellular communication service to the UE 20 positioned inside a cell. For example, the eNB 30 schedules resources for the UE 10 and the UE 20 to communicate by, and notifies the UE 10 and the UE 20 of the scheduled resources.

Additionally, the eNB 30 conducts uplink communication or downlink communication with the UE 10 and the UE 20 in the relevant resources.

The GNSS satellite 40 is an artificial satellite (communication device) that circles around the earth following a certain orbit. The GNSS satellite 40 transmits a Global Navigation Satellite System (GNSS) signal including a navigation message. The navigation message includes various information for position measurement, such as orbit information and time information of the GNSS satellite 40.

The RSU 50 is a communication device installed on the roadside. The RSU 50 is able to communicate bidirectionally with the vehicle 22 or the UE 20 onboard the vehicle 22, or the UE 10 carried by a user 12. Note that the RSU 50 may conduct DSRC communication with the vehicle 22 or the UE 20 onboard the vehicle 22, or the UE 10 carried by the user 12, but in the present embodiment, it is anticipated that the RSU 50 also communicates with the vehicle 22 or the UE 20 onboard the vehicle 22, or the UE 10 carried by the user 12 according to a cellular communication method.

The UE 20 is a communication device installed onboard the vehicle 22, and moves as the vehicle 22 travels. The UE 20 has a function of communicating with the eNB 30 under control by the eNB 30. Additionally, the UE 20 has a function of receiving the GNSS signal transmitted from the GNSS satellite 40, and measuring position information of the UE 20 from the navigation message included in the GNSS signal. The UE 20 also has a function of communicating with the RSU 50. Furthermore, the UE 20 according to the present embodiment is also capable of communicating directly with the UE 10 carried by the user 12 or a UE 20 onboard another vehicle 22, or in other words, conducting device-to-device (D2D) communication. The UE 20 and the mobile object 22 will be referred to collectively as a UE 20 below unless it is particularly necessary to distinguish them from each other.

The UE 10 is a communication device carried by the user 12 and moves in accordance with walking and running of the user 12 or movement of a vehicle (a bus, a bike, a car, or the like) that the user 12 is riding. The UE 10 has a function of communicating with the eNB 30 under control by the eNB 30. Additionally, the UE 10 has a function of receiving the GNSS signal transmitted from the GNSS satellite 40, and measuring position information of the UE 10 from the navigation message included in the GNSS signal. The UE 10 also has a function of communicating with the RSU 50. Furthermore, the UE 10 according to the present embodiment is also capable of communicating directly with other UE 10 or the UE 20, or in other words, conducting device-to-device (D2D) communication. Communication performed between the UE 10 and the UE 20 is also called V2P communication.

Note that although FIG. 10 illustrates the vehicle 22 as an example of a mobile object, the mobile object is not limited to the vehicle 22. For example, the mobile object may also be an object such as a marine vessel, an aircraft, or a bicycle. In addition, although the above describes the UE 20 as including the function of receiving the GNSS signal, the vehicle 22 may have the function of receiving the GNSS signal, and the vehicle 22 may output a GNSS signal reception result to the UE 20.

2.2. Configuration Example of UE (User Terminal)

Figure 11:
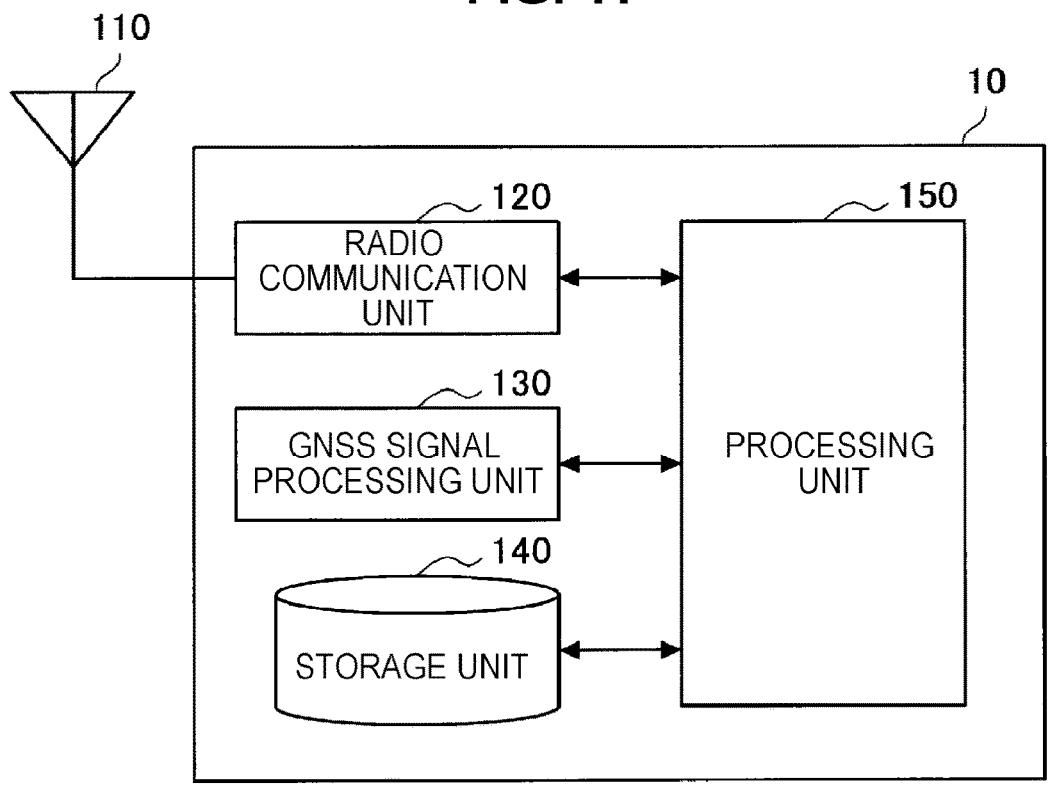
FIG. 11 is a block diagram illustrating an example of a logical configuration of UE according to the embodiment.

FIG. 11 is a block diagram illustrating an example of a logical configuration of the UE 10 according to an embodiment of the present disclosure. The UE 10 according to the present embodiment includes an antenna unit 110, a radio communication unit 120, a GNSS signal processing unit 130, a storage unit 140, and a processing unit 150 as illustrated in FIG. 11.

The antenna unit 110 radiates signals output from the radio communication unit 120 into space as radio waves. In addition, the antenna unit 110 converts radio waves in space into signals and outputs the signals to the radio communication unit 120.

The radio communication unit 120 transmits and receives signals. For example, the radio communication unit 120 receives downlink signals from the eNB 30 and transmits uplink signals to the eNB 30. In addition, the radio communication unit 120 transmits and receives sidelink signals to and from another UE 10, the UE 20, or the RSU 50.

The GNSS signal processing unit 130 processes a GNSS signal transmitted from the GNSS satellite 40. For example, the GNSS signal processing unit 130 processes the GNSS signal to thereby measure position information and time information of the UE 10.

The storage unit 140 temporarily or permanently stores programs and various data for operating the UE 10.

The processing unit 150 provides various functions of the UE 10. For example, the processing unit 150 controls communication performed by the radio communication unit 120.

2.3. Configuration Example of UE (Mobile Object)

Figure 12:
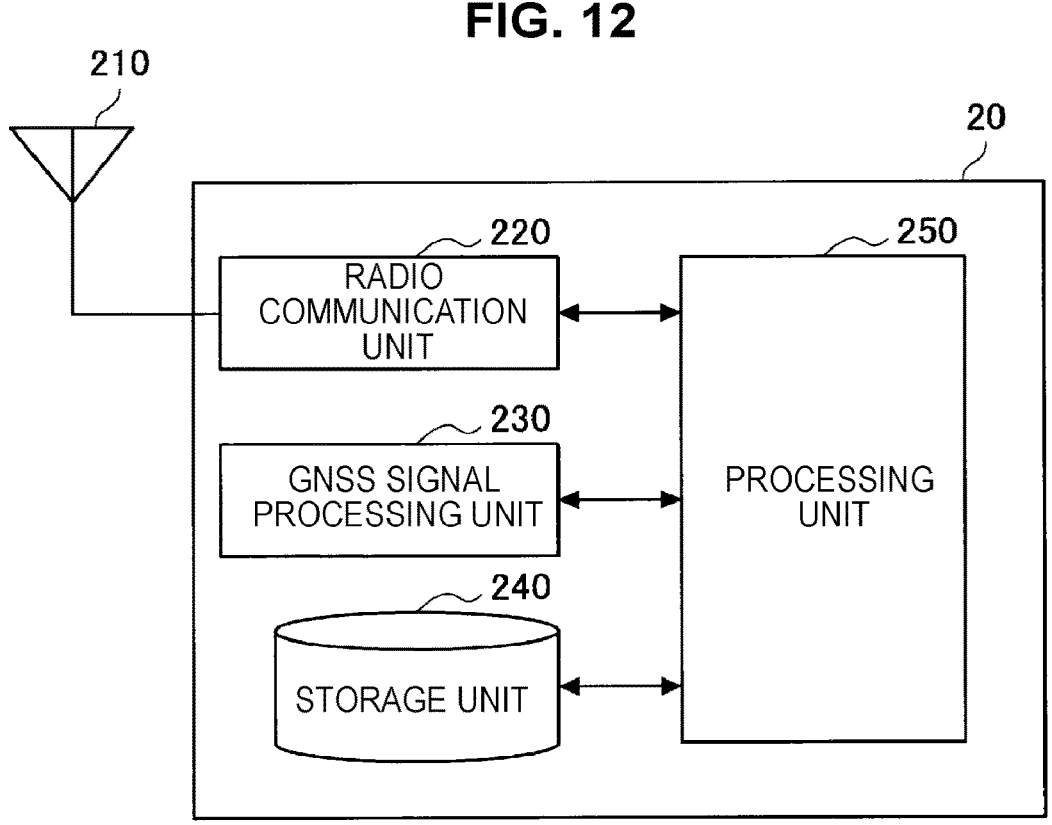
FIG. 12 is a block diagram illustrating an example of a logical configuration of UE according to the embodiment.

FIG. 12 is a block diagram illustrating an example of a logical configuration of the UE 20 according to an embodiment of the present disclosure. The UE 20 according to the present embodiment includes an antenna unit 210, a radio communication unit 220, a GNSS signal processing unit 230, a storage unit 240, and a processing unit 250 as illustrated in FIG. 12.

The antenna unit 210 radiates signals output from the radio communication unit 220 into space as radio waves. In addition, the antenna unit 210 converts radio waves in space into signals and outputs the signals to the radio communication unit 220.

The radio communication unit 220 transmits and receives signals. For example, the radio communication unit 220 receives downlink signals from the eNB 30 and transmits uplink signals to the eNB 30. In addition, the radio communication unit 220 transmits and receives sidelink signals to and from the UE 10, another UE 20, or the RSU 50.

The GNSS signal processing unit 230 processes a GNSS signal transmitted from the GNSS satellite 40. For example, the GNSS signal processing unit 230 processes the GNSS signal to thereby measure position information and time information of the UE 20.

The storage unit 240 temporarily or permanently stores programs and various data for operating the UE 20.

The processing unit 250 provides various functions of the UE 20. For example, the processing unit 250 controls communication performed by the radio communication unit 220.

2.4. Configuration Example of eNB

Figure 13:
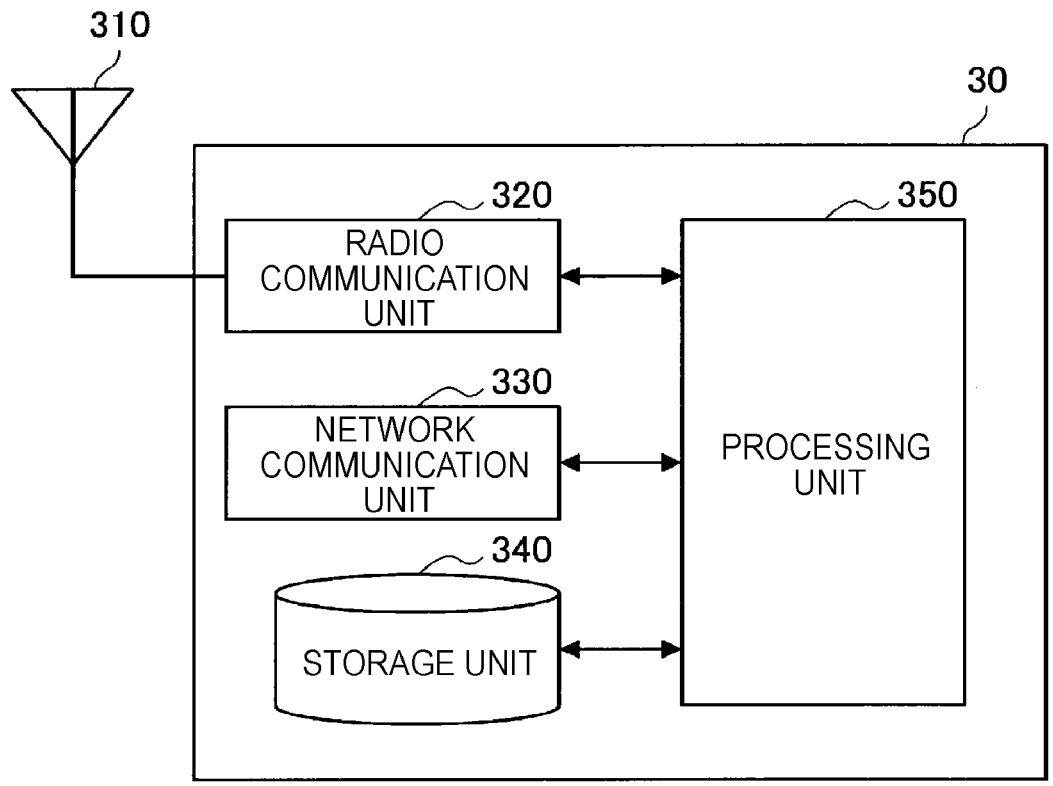
FIG. 13 is a block diagram illustrating an example of a logical configuration of an eNB according to the embodiment.

FIG. 13 is a block diagram illustrating an example of a logical configuration of the eNB 30 according to an embodiment of the present disclosure. The eNB 30 according to the present embodiment includes an antenna unit 310, a radio communication unit 320, a network communication unit 330, a storage unit 340, and a processing unit 350 as illustrated in FIG. 13.

The antenna unit 310 radiates signals output from the radio communication unit 320 into space as radio waves. In addition, the antenna unit 310 converts radio waves in space into signals and outputs the signals to the radio communication unit 320.

The radio communication unit 320 transmits and receives signals. For example, the radio communication unit 320 receives uplink signals from the UE 10, the UE 20, or the RSU 50 and transmits downlink signals to the UE 10, the UE 20, or the RSU 50.

The network communication unit 330 transmits and receives information. For example, the network communication unit 330 transmits information to another node and receives information from another node. The other node includes, for example, another base station and another core network node.

The storage unit 340 temporarily or permanently stores programs and various data for operating the eNB 30.

The processing unit 350 provides various functions of the eNB 30. For example, the processing unit 350 controls communication performed by the UE 10, the UE 20, and the RSU 50 placed under control of the eNB.

2.5. Configuration Example of RSU

Figure 14:
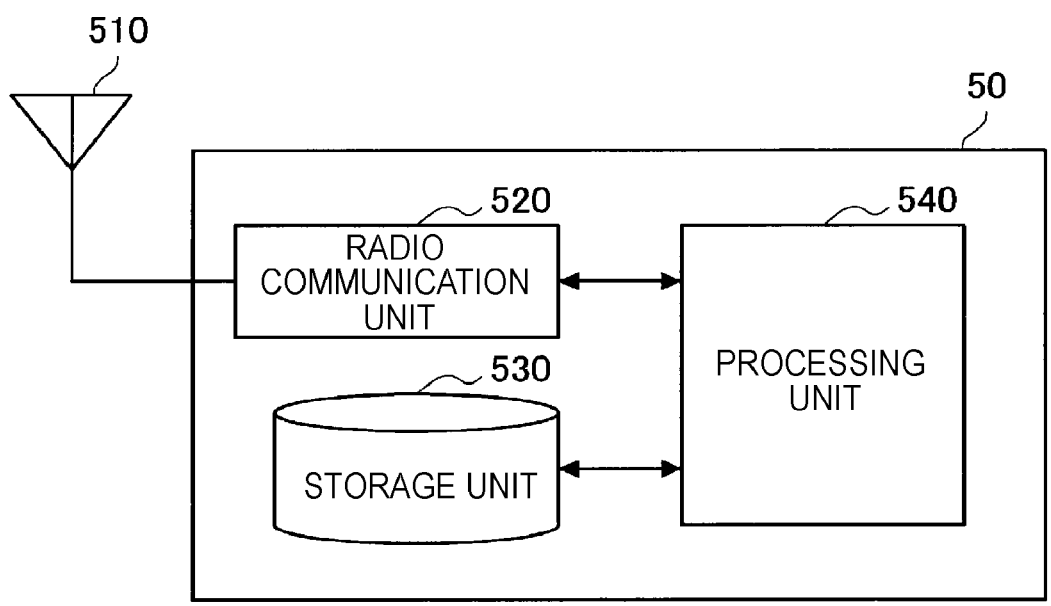
FIG. 14 is a block diagram illustrating an example of a logical configuration of an RSU according to the embodiment.

FIG. 14 is a block diagram illustrating an example of a logical configuration of the RSU 50 according to an embodiment of the present disclosure. The RSU 50 according to the present embodiment includes an antenna unit 510, a radio communication unit 520, a storage unit 530, and a processing unit 540 as illustrated in FIG. 14.

The antenna unit 510 radiates signals output from the radio communication unit 520 into space as radio waves. In addition, the antenna unit 510 converts radio waves in space into signals and outputs the signals to the radio communication unit 520.

The radio communication unit 520 transmits and receives signals. For example, the radio communication unit 520 receives downlink signals from the eNB 30 and transmits uplink signals to the eNB 30. In addition, the radio communication unit 520 transmits and receives sidelink signals to and from the UE 10, the UE 20, or another RSU 50.

The storage unit 530 temporarily or permanently stores programs and various data for operating the RSU 50.

The processing unit 540 provides various functions of the RSU 50. For example, the processing unit 540 controls communication performed by the radio communication unit 520.

The configuration examples shared by each of embodiments have been described above.

3. Technical Features

Next, technical features of each embodiment will be described in detail.

3.1. Realization of SPS

First, an example of a mechanism for realizing SPS will be described. In order to perform scheduling semi-persistently, it is necessary to flexibly report data resources with low overhead (Overhead).

Figure 15:
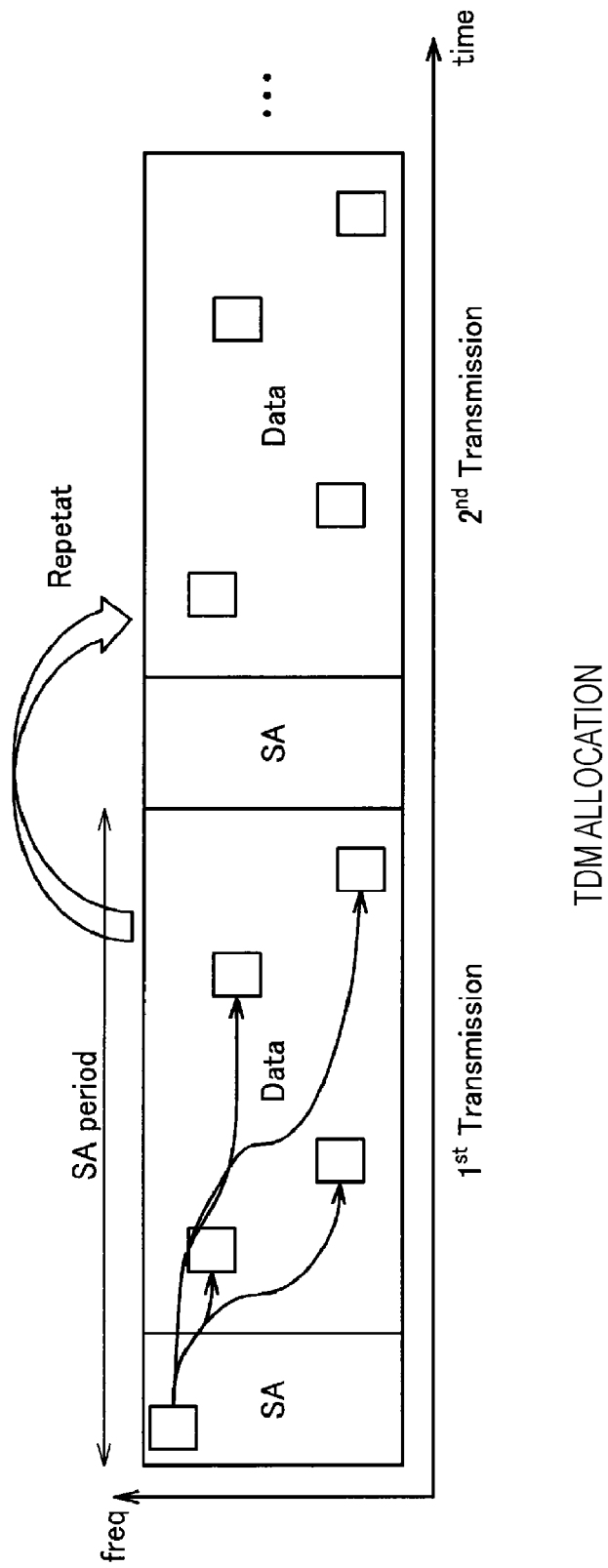
FIG. 15 is an explanatory diagram for describing an example of a case in which SPS is applied to TDM.

(a) Case of TDM First, the case of TDM will be focused on. For example, FIG. 15 is an explanatory diagram for describing an example of a case in which SPS is applied to TDM. In FIG. 15, a case in which four pieces of data (Data) are repeated (Repetition) is exemplified. The definition of an "SA period" in D2D is applied to TDM. $1^{st}$ transmission is to report a location of each of data resources, and $2^{nd}$ transmission and the following transmission are for repetition (Repeat). As an option (Option), adjustment such as frequency hopping, and subframe shift may be performed. When frequency hopping is performed, information regarding hopping (Hopping) is reported with control information (SA). When subframe shift is performed, a shift amount is reported with SA. In a case in which frequency hopping or subframe shift is performed, a hopping (Hopping) amount or a shift amount may be changed using the number of SPS transmission operations as a parameter. The "SA period" may be reported from the base station as in D2D or may be set in advance (Preconfigure).

(b) Case of FDM

Next, the case of FDM will be focused on. In the case of FDM, introduction of "FDM SA period," introduction of "SPS data offset," and a method of dividing an "SA resource pool" and a "data resource pool" in a time direction will be described.

(b-1) Introduction of FDM SA Period

The introduction of "FDM SA period" will be described. In the present description, first, the definition and setting of a parameter will be described. It is difficult to apply the definition of an "SA period" in D2D to FDM, unlike TDM. Thus, an "FDM SA period" is newly defined.

Here, an "FDM SA period" is assumed to indicate a resource pool set of control information (SA) and data (Data). Transmission of SA transmitted in the "FDM SA period" and data related thereto is completed within the "FDM SA period." The "FDM SA period" may be defined for each UE or defined for all pieces of UE in common.

Figure 16:
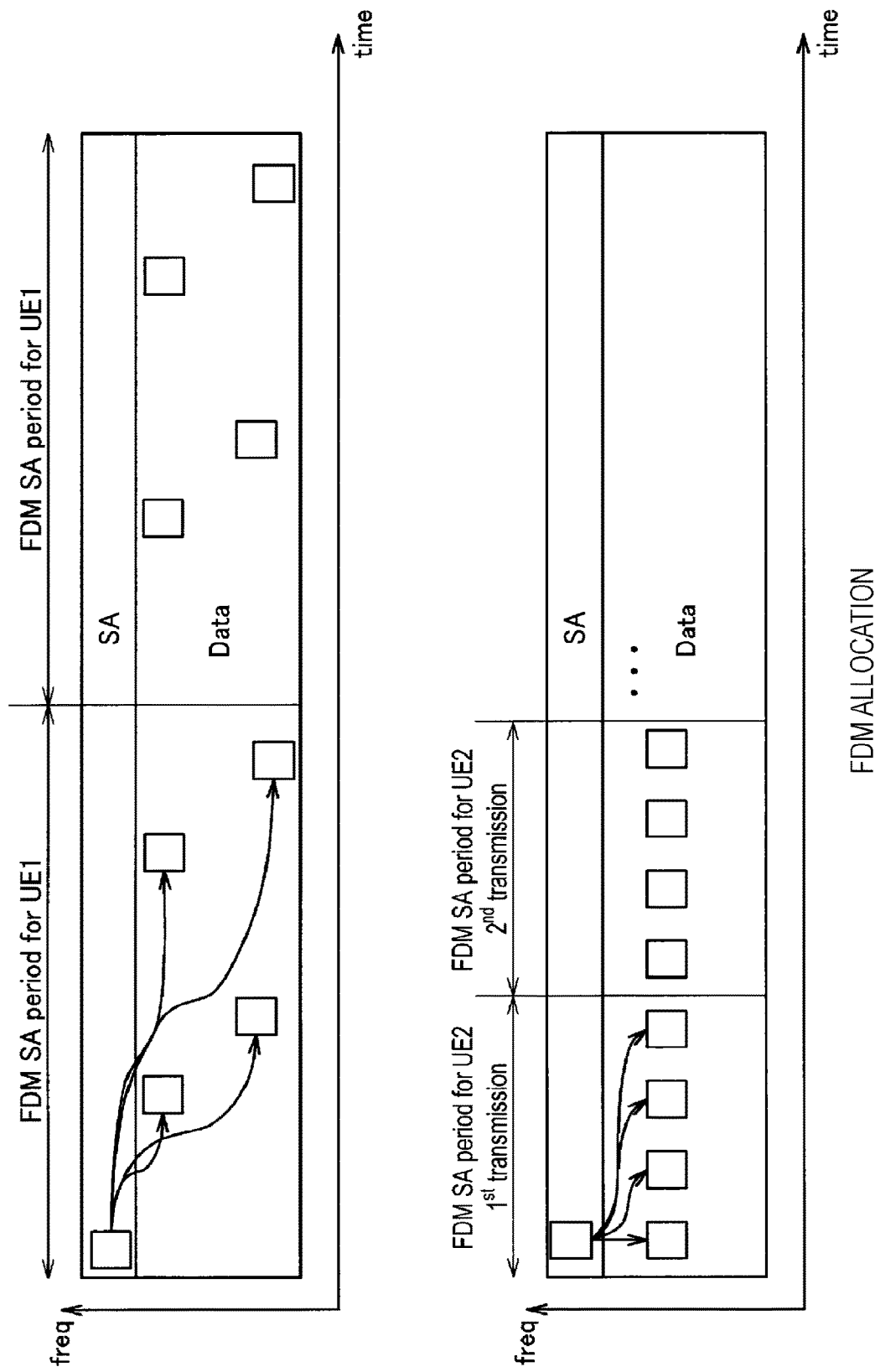
FIG. 16 is a diagram illustrating an example of SPS using FDM SA periods.

As in TDM, frequency hopping (Hopping), subframe shift, and the like can be performed, and adjustment can be performed in the time and frequency directions. For example, FIG. 16 is a diagram illustrating an example of SPS using "FDM SA periods".

Next, an example of allocation and reporting of the parameter will be described. An "FDM SA period" may be allocated by the base station, or may be arbitrarily set by a UE terminal by itself. In addition, it may be set in accordance with a type of traffic (Event trigger, Periodical, etc.). The type of traffic and an "FDM SA period" allocation table may be reported from the base station, or may be set in advance (Preconfigured). In addition, a value common for all pieces of UE may be set. In this case, it may be set by the base station or may be set in advance (Preconfigured) likewise. In addition, an "FDM SA period" may be unique to a resource pool (Resource pool). Information of the number of transmission operations is reported to a reception terminal using SA on the basis of "FDM SA periods" as "SPS periods (in other words, periods in which SPS is set)." The "SPS periods" are reported using the "FDM SA periods" and the number of SPS operations.

(b-2) Introduction of SPS Data Offset

Next, the introduction of an "SPS data offset" will be described. In the present description, first, the definition and setting of a parameter will be described. In an "FDM SA period," the area of SA portions becomes useless from the second and following transmission and thus there is concern of latency (Latency) worsening. For this reason, an "SPS data offset" is introduced to perform SPS taking only a data part into account.

Figure 17:
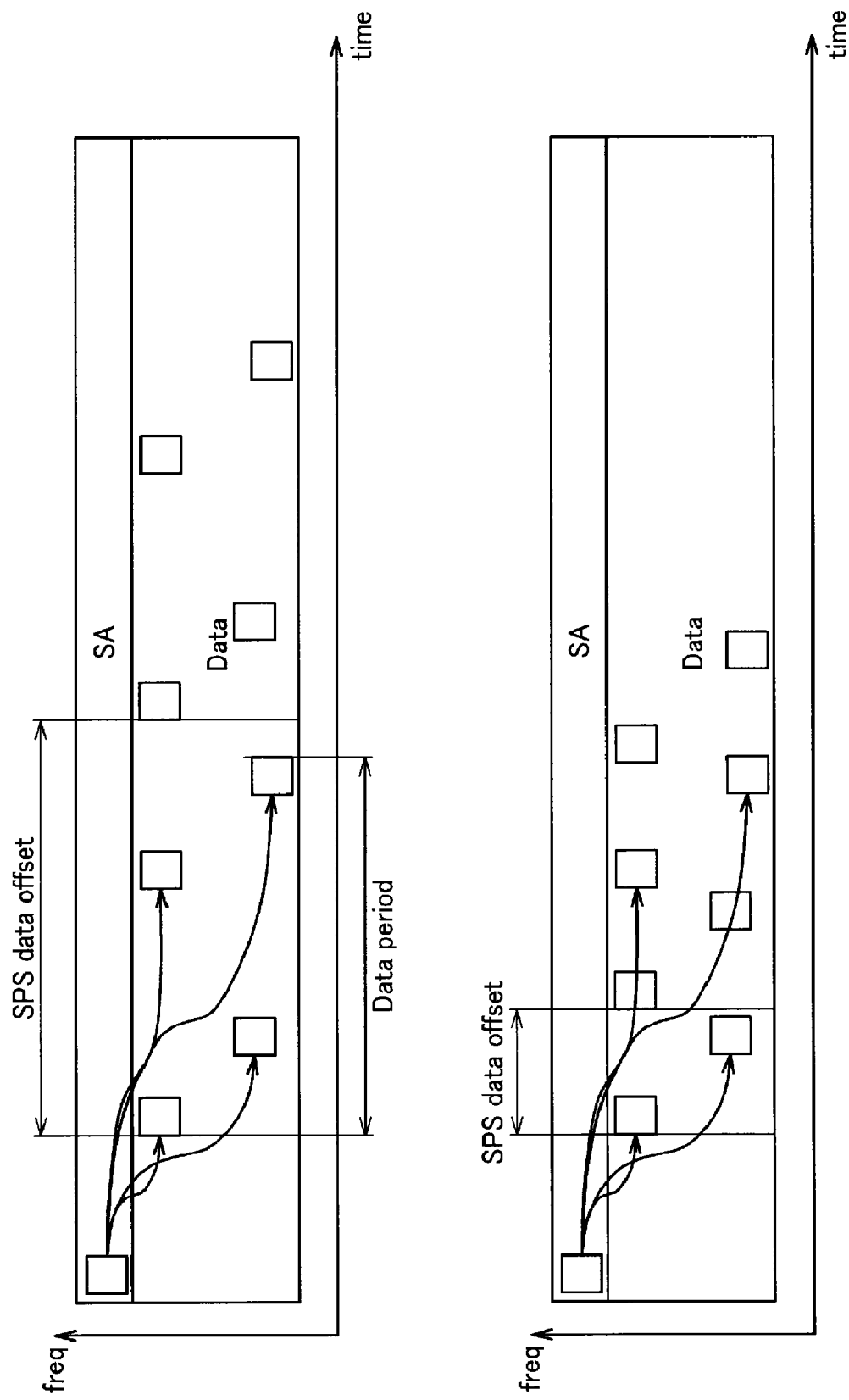
FIG. 17 is an explanatory diagram for describing an introduction example of SPS data offsets.

For example, FIG. 17 is an explanatory diagram for describing an introduction example of "SPS data offsets." An "SPS data offset" is basically set to be longer than a period in which a total of four transmission operations including a first data transmission and three repetitive transmission operations (Repetition) are performed (which is defined as a "data period"), however, it also can be set to be shorter than that. As in TDM, frequency hopping (Hopping), subframe shift, or the like is performed, and adjustment can also be performed in the time and frequency directions.

Next, an example of allocation and reporting of the parameter will be described. An "SA data offset" may be allocated by the base station, or may be arbitrarily set by UE by itself. In addition, it may be set in accordance with a type of traffic (Event trigger, Periodical, etc.). The type of traffic and an "SA data offset" allocation table may be reported from the base station, or may be set in advance (Preconfigured). In addition, a value common for all pieces of UE may be set. In this case, it may be set by the base station or may be set in advance (Preconfigured) likewise. In addition, an "SA data offset" may be unique to a resource pool (Resource pool). Information of the number of transmission operations is reported to a reception terminal using SA on the basis of "SA data offsets" as "SPS periods." The "SPS periods" are reported using the "SA data offsets" and the number of SPS operations.

Figure 18:
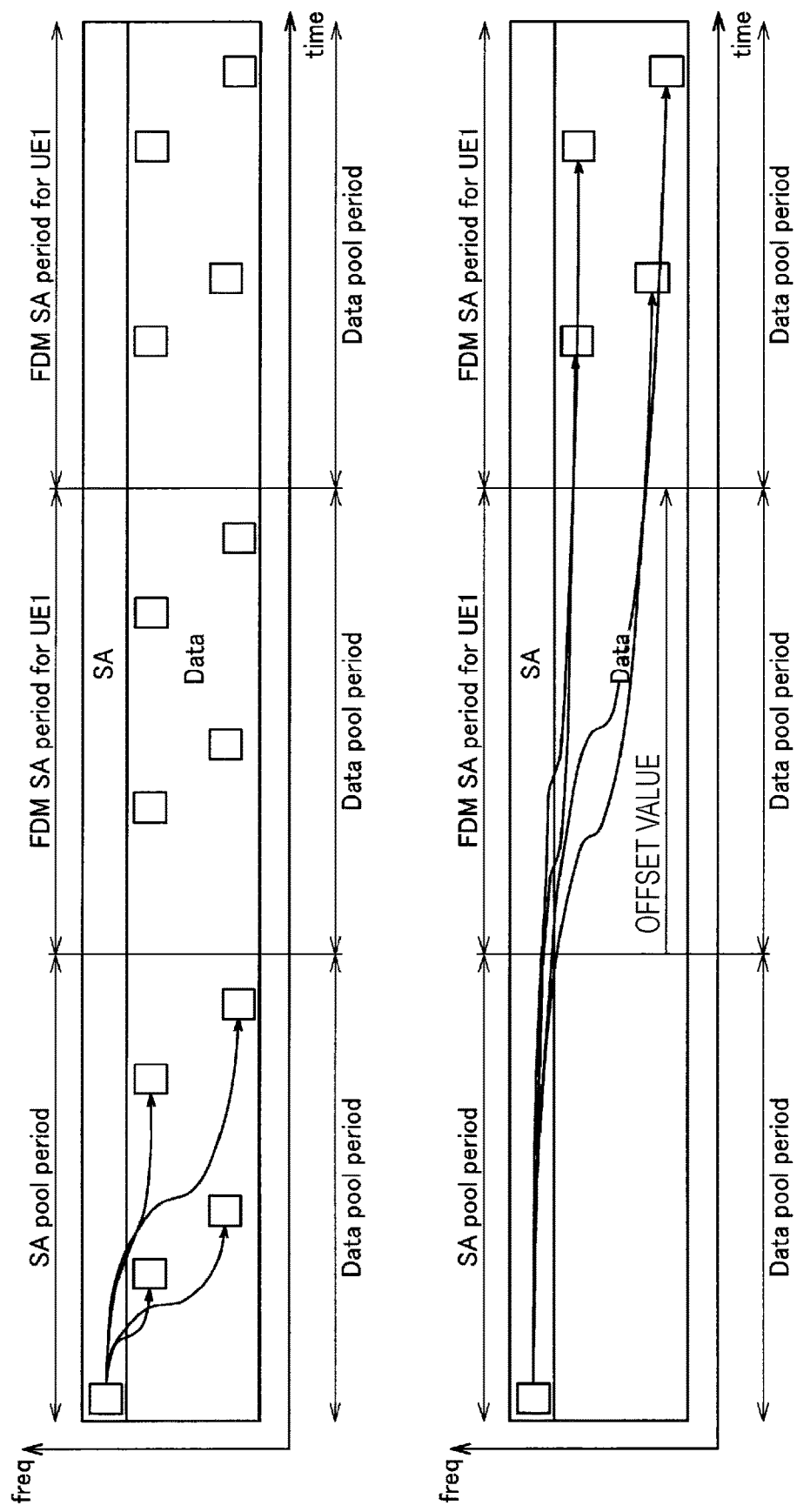
FIG. 18 is an explanatory diagram for describing SA pool periods, data pool periods, and an offset value.

(b-3) Method of Dividing SA Resource Pool and Data Resource Pool in Time Direction Next, a method of dividing an "SA resource pool" and a "data resource pool" in the time direction will be described. In the present description, first, the definition and setting of the parameters will be described. With respect to an "SA resource pool" and a "Data resource pool," "SA pools" and "Data pools" are divided to have uniform times as in TDM. "SA pool periods," "data pool periods," and an offset (Offset) value are introduced. For example, FIG. 18 is an explanatory diagram for describing "SA pool periods," "Data pool periods," and an offset (Offset) value. As illustrated in FIG. 18, a "Data pool" related to an "SA pool" can be allocated in the same time, and an offset (Offset) value of the "Data pool" related to the "SA pool" can also be reported. In addition, the above-described "FDM SA period" can also be set (Configure) using the "SA pool," "Data pool," and offset (Offset) value.

Next, an example of allocation and reporting of the parameters will be described. The "SA pool period," "Data pool period," and offset (Offset) value can be allocated by the base station or can be arbitrarily set by UE itself, similarly to the above-described "FDM SA period" and "SPS data offset." In addition, they may be set in accordance with a traffic type (Event trigger, Periodical, etc.). The traffic type and an "SA data offset" allocation table may be reported from the base station or may be set in advance (Preconfigured). In addition, a value common for all pieces of UE may be set. In this case, it may be set by the base station or may be set in advance (Preconfigured). In addition, an offset (Offset) value unique to a resource pool (Resource pool) may be introduced.

3.2. Configuration and Reconfiguration of SPS

Next, a method of configuration (Configuration) and reconfiguration (Reconfiguration) of SPS will be described. It is desirable to consider cases of both Mode 1 and Mode 2 for a setting and a resetting of SPS. In addition, countermeasures are necessary in a case of handover (HO) of a base station or a change in geo-location-based resource pool allocation or the like. In addition, in a case in which transmission of an "Event trigger message" is necessary during transmission of SPS, or the like, it is necessary to release (Release) or suspend (Suspend) SPS in a hurry.

(a) Communication in Mode 1

First, communication in Mode 1 will be described.

(a-1) Process Flow

Figure 19:
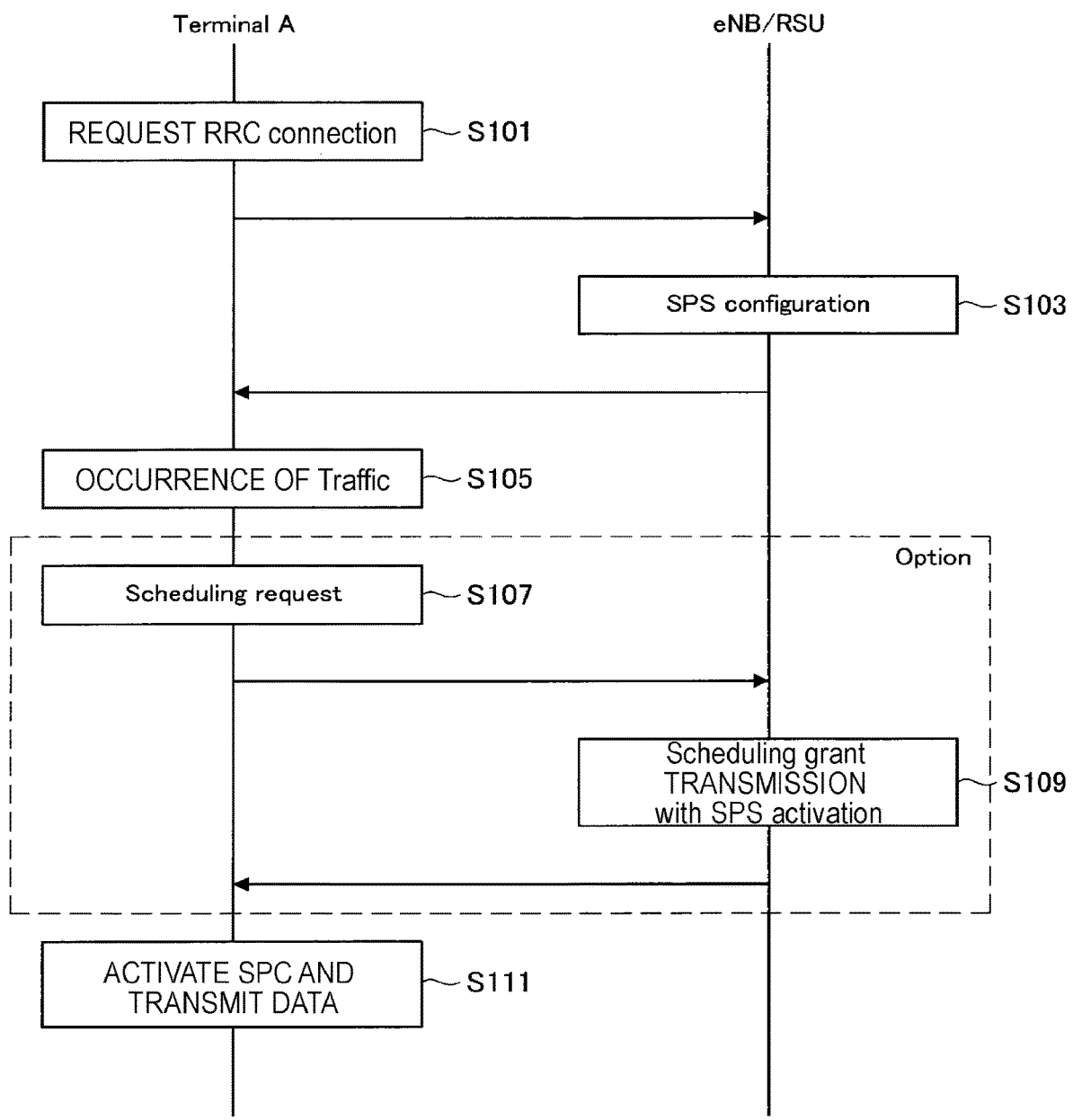
FIG. 19 is a diagram illustrating an example of a flow of a series of processes in a case in which a base station executes resource allocation of SPS in Mode 1 communication.
Figure 20:
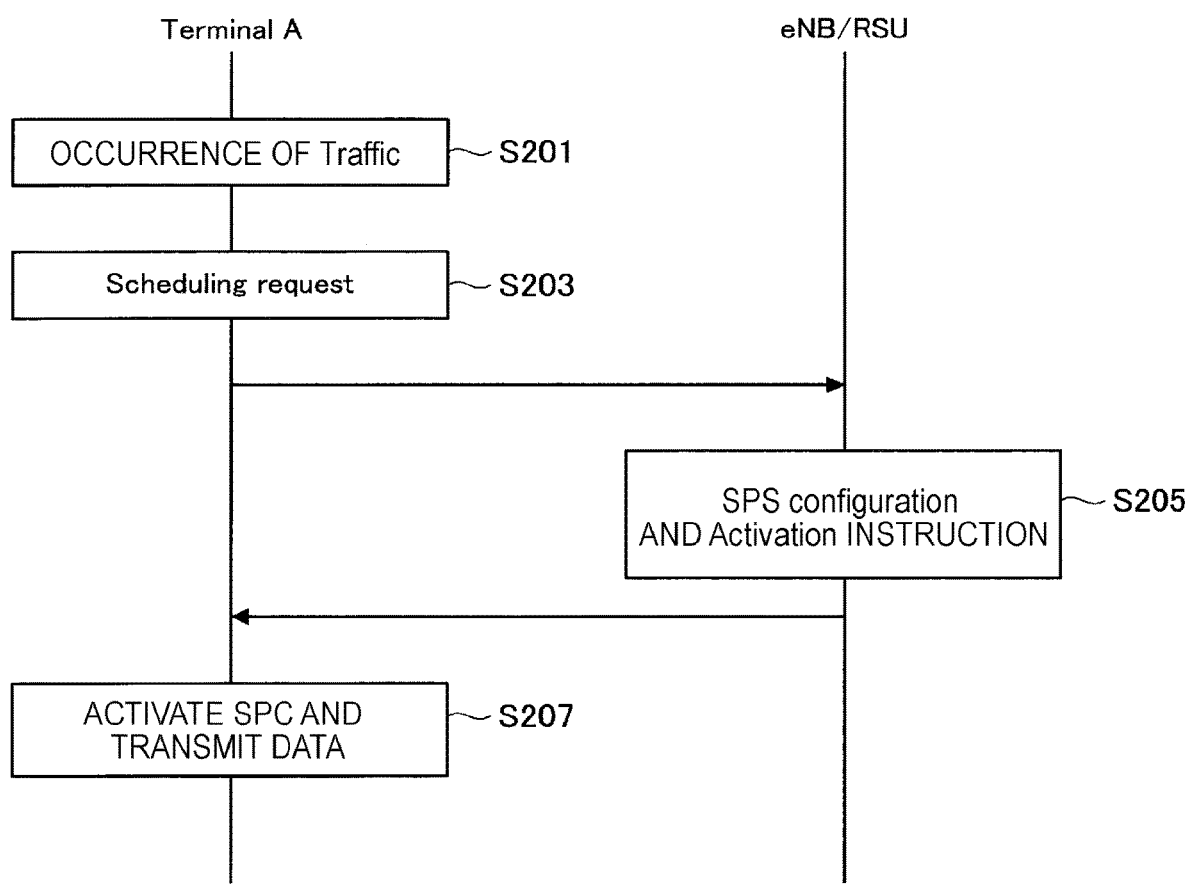
FIG. 20 is a diagram illustrating an example of a flow of a series of processes in a case in which a base station executes resource allocation of SPS in Mode 1 communication.

For example, FIGS. 19 and 20 illustrate examples of flows of series of processes in a case in which the base station (an RSU is also possible) executes allocation of resources of SPS in Mode 1 communication.

(a-1-1) Case in which SPS is Preset

First, an example of a case in which SPS is preset will be described with reference to FIG. 19. In this case, first, the base station performs configuration (Configuration) of SPS triggered by an RRC connection request (S101), and presets (Configure) SPS for a terminal (S103). The base station reports SPS configuration (Configuration) by using any of an RRC connection setup, an RRC connection reconfiguration, and an RRC connection re-establishment message to the terminal.

In a case in which traffic using the SPS, for example, "Periodical traffic" or the like occurs (S105), the terminal side activates (Activate) and transmits the set (Configure) SPS (S111). Then, after the transmission is completed, release (Release) is performed. After the traffic (Traffic) occurs (S105), a "Scheduling request" may be transmitted to the base station side to confirm activation (Activation) (S107). At the same time as "Scheduling grant," the base station side performs activation (Activation) of SPS (S109). The terminal side activates (Activation) and transmits the preset (Configured) SPS (S111).

(a-1-2) Case in which SPS is Appropriately Set

Next, an example of a case in which SPS is appropriately set will be described with reference to FIG. 20. At the time point at which traffic for SPS occurs (S201), the terminal transmits a scheduling request to the base station (S203). The base station side performs "SPS configuration" and returns an activation (Activation) instruction to the terminal side (S205). The terminal that has received the instruction executes SPS transmission as instructed (S207).

(a-2) SPS Configuration Message

Next, an "SPS configuration message" will be described. An "SPS configuration message" includes "Resource allocation" information. For example, "Resource allocation" information includes position information of allocated resources. As a specific example of position information of allocated resources, position information of resources of $1^{st}$ transmission is exemplified. In addition, as another example, transmission frame information, pool information, SA period information, and the like of $2^{nd}$ and the following transmission may be included. The information is reported using, for example, an SA Pool, a Data pool, an FDM SA period, an SPS Data offset value, or the like. In addition, on the assumption of retransmission of a Hybrid Automatic Repeat reQuest" (HARQ), HARQ retransmission resource information may be included.

In addition, the "Resource allocation" information may include transmission operation frequency information. As the transmission operation frequency information, from "2" to "no regulation" can be set. In the case of "no regulation," transmission continues until SPS is released (Release).

In addition, the "Resource allocation" information may include information representing the number of repetitions (Repetition). With this information, the number of repetition (Repetition) at each transmission location is instructed. For example, control can be performed such that the number of "Data repetition" operations increases from 4 to 5 only for $3^{rd}$ transmission, or the like.

In addition, the "Resource allocation" information may include transmission power information. The transmission power information may be stipulated for each transmission location or may be common for the whole.

In addition, the "Resource allocation" information may include "Component carrier" information. For example, in a case in which multicarrier communication is performed, target "Component carrier" information may be reported.

In addition, the "Resource allocation" information may include target resource pool (Resource Pool) information. The target resource pool information represents to which resource pool SPS has been set.

In addition, the "Resource allocation" information may include redundancy version (RV) information. Note that an RV may be set for each transmission location or may be set in common. In addition, an RV may be set in advance (Preconfigured).

In addition, the "Resource allocation" information may include information representing a "Suspend period." The information represents a setting of a stop period in a case in which, for example, it is necessary to transmit an "Event trigger message" or the like and SPS is temporarily stopped. Note that a "Suspend period" is set using a parameter of, for example, an "SA period," an "SA pool," a "Data pool," or the like.

(a-3) SA Contents Information

Next, "SA contents information" will be described. A transmission terminal transmits SA (control information) and Data to a reception terminal at the time of SPS transmission. Here, contents of SA will be described. As contents of SA, position information of allocated resources, transmission operation frequency information, information representing the number of repetitions (Repetition), transmission power information, and RV information are exemplified, similarly to the above-described SPS configuration. Note that detailed description of the information will be omitted because it is similar to the case of the SPS configuration.

(a-4) SPS Re-Configuration/Release Method

Figure 21:
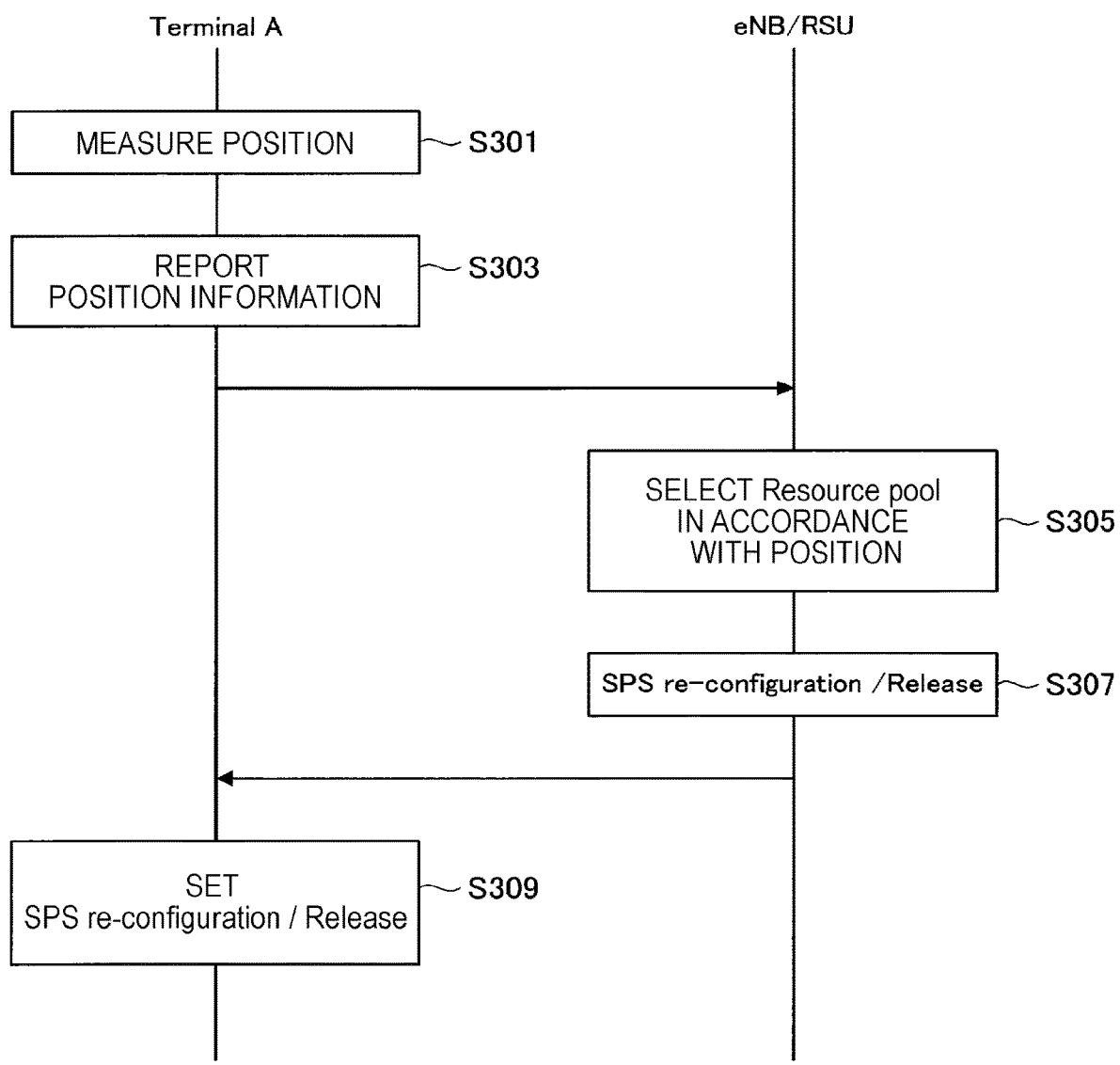
FIG. 21 is an explanatory diagram for describing an example of a method of reconfiguration and release of SPS using position information.

Next, an example of a method of reconfiguration (Re-configuration) and release (Release) of SPS using position information will be described with reference to FIG. 21. FIG. 21 is an explanatory diagram for describing an example of the method of reconfiguration and release of SPS using position information.

First, a terminal performs position measurement (S301) and reports position information to the base station (S303). Then, the base station side executes allocation of resource pools (Resource pool) in accordance with the position information (Geo-location-based resource allocation) (S305). In addition, the base station executes release (Release) of SPS for resource pools (RP) up to that point and reconfiguration (Re-configuration) on new resource pools (RP) if necessary (S307).

Here, an example of allocation of resource pools (Resource pool) in accordance with position information will be described. For example, SPS for resource pools (Resource pool) that have not been used at a reported position of a terminal is released. In addition, a future position of the terminal is predicted, and SPS for resource pools (Resource pool) to be used in the future is set (Configured). Then, target resource pools and "SPS configuration" thereof are reported.

Note that a result of release (Release) or reconfiguration (Reconfiguration) is reported to the terminal, and the terminal executes release (Release) or reconfiguration (Reconfiguration) of SPS as instructed by the base station (S309).

(a-5) Other SPS Release Method

Next, another example of the method of releasing SPS will be described. For example, a method of releasing SPS in a case in which a terminal is in an idle (IDLE) mode is exemplified. In this case, the terminal detects its idle mode by itself and releases SPS in a case in which the terminal transitions to the idle mode.

In addition, the terminal may release SPS in a case in which the terminal is out of coverage of the base station. In this case, the terminal measures Reference Signal Received Power (RSRP), then determines that the terminal is out of coverage in a case in which the measurement result is equal to or smaller than a predetermined threshold value, and releases SPS.

In addition, the terminal may release SPS at the time of handover (Hand over) to a base station. In this case, the terminal releases SPS of the handover source base station when handover (Hand over) to a new base station is performed. Reporting of release of SPS may be made by the handover destination base station, or determination may be made on the terminal side on the basis of RSRP of the handover source base station, or the like.

In addition, there is a method of releasing SPS on the basis of reporting of the termination of a "Mode 1 operation." In this case, in a case in which the base station reports the termination of the "Mode 1 operation" to the terminal, SPS is released at the same time.

In addition, there is a method of release in a case in which there is a release request from a peripheral terminal. In this case, the terminal releases SPS in a case in which, for example, there is an SPS release request from the peripheral terminal using V2V communication. Note that the terminal that has received the release request may report the release to the base station. In addition, in a case in which there is an SPS release request from the peripheral terminal to the base station, the base station may issue a release request to a target terminal. At this time, the peripheral terminal may report the ID of the target terminal. The base station may release SPS with respect to the terminal ID reported from the peripheral terminal or may arbitrarily select release.

In addition, there is a method of release in a case in which there is no traffic using SPS. In this case, in a case in which it is not necessary to transmit Periodical traffic that is likely to use SPS, the terminal reports the fact to the base station. Note that it may be reported using a buffer status report (BSR). At this time, the terminal releases SPS without change.

In addition, there is a method of release on the basis of position information of a terminal. In this case, the base station (eNB) may instruct release of SPS using position information of the terminal. In addition, the terminal may execute release of SPS on the basis of its own position information.

In addition, there is a method of release by the base station based on a use situation of a radio frequency. For example, in a case in which a radio frequency becomes tight, using SPS is stopped to perform release control more exactly.

(b) Communication in Mode 2

Next, communication in Mode 2 will be focused on. In communication in Mode 2, for example, a terminal itself may select resources necessary for transmission from a resource pool and transmit the resources. In this case, resource pool information may be reported from the base station, or may be set in advance (Preconfigured). Note that, when the resources are selected, a transmission terminal performs sensing, for example, to select resources that are less likely to cause collision (Collision) with another user and attempts to allocate resources not being used by other users as much as possible. Note that sensing methods include "energy sensing" and "SA decoding" methods.

Figure 22:
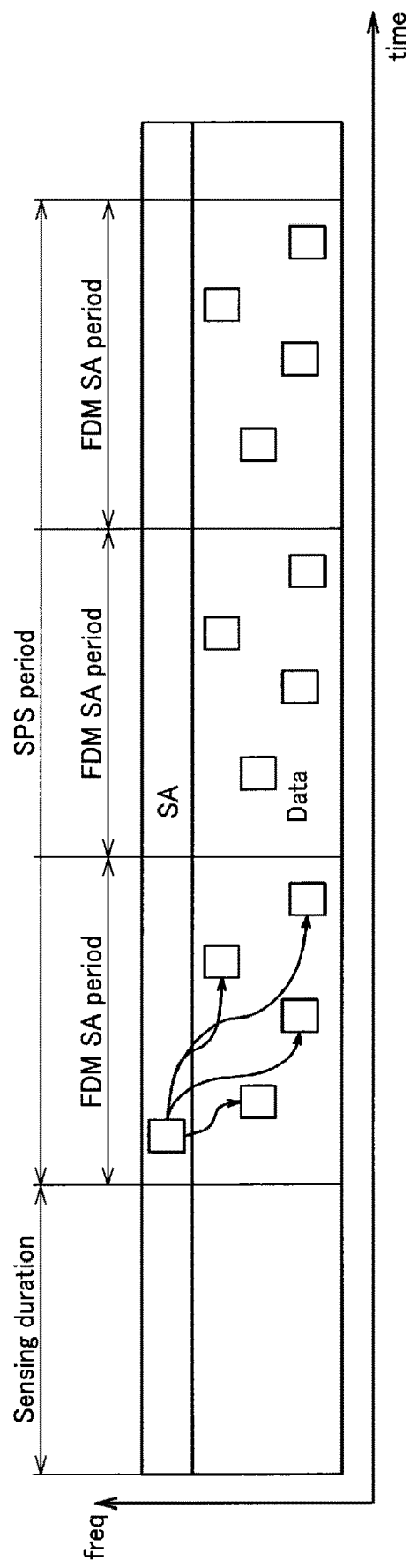
FIG. 22 is a diagram illustrating an example of a case in which sensing and SPS are used together.

FIG. 22 illustrates an example of a case in which, for example, sensing and SPS are used together. In this case, a terminal executes sensing (Sensing) before selecting release of SPS, and executes allocation of resources so as to select resources that are not being used by other terminals on the basis of the sensing result. The allocation of resources may be fixed (Fix) in each "SA period." In addition, as another example, the allocation of resources may be performed flexibly (Flexible) such that a frequency-time position is arbitrarily changed in a Period.

(b-1) Resource Selection Method of Terminal

Here, a resource selection method by a terminal will be described. Two main points to be noted when selecting resources are as follows.

There are cases in which two users perform sensing at the same time and resource allocation overlaps. This needs to be avoided because there is a possibility of collision (Collision) continuously occurring during periods of SPS depending on a release selection method.

An important point is how to report resources selected by a terminal to another terminal with less overhead.

Taking the above-described two points into account, five resource selection methods from selection method 1 to selection method 5 are proposed as follows.

Selection method 1: a method of arbitrarily selecting resources

Selection method 2: a method of using a specific transmission pattern in "SA periods"

Selection method 3: a hybrid (Hybrid) type of the selection methods 1 and 2

Selection method 4: a method of a transmission terminal for detecting collision by itself and executing reconfiguration (Reconfiguration) of SPS Selection method 5: a method of causing a neighboring terminal, the base station, or an RSU to detect a collision and switching a transmission method (collision feedback)

First, the selection method 1 will be described. In this case, for example, a terminal arbitrarily selects available resources on the basis of a sensing result. Since there is no correlation of resource allocation between "SA periods," a possibility of collisions (Collision) continuously occurring is low. The terminal reports information of the selected resources to a reception side using a bitmap table. In this case, a huge number of bits are necessary.

Next, the selection method 2 will be described. In this case, a terminal, for example, recognizes available resources on the basis of a sensing result. Then, the terminal selects several candidates for patterns in which it is less likely to cause a collision with another user from defined transmission patterns (in other words, patterns of resource allocation for transmission), and selects one therefrom at random. Note that, in a case in which there is a terminal that has selected resources at the same time, there is a possibility of selecting the same pattern. In addition, in a case in which there are not sufficient patterns, there is a case in which it is difficult to utilize a sensing result at the maximum (it is unavoidable even if sensing is performed and occupancy of resources is ascertained). The terminal reports selected pattern information as a pattern index (Index). The number of bits necessary for reporting is relatively small. A fixed (FIX) transmission method of copying the position of 1st transmission for all transmission areas is also included in the method.

Next, the selection method 3 will be described. In this case, arbitrary selection is performed up to N-th (N is a natural number) transmission, and then transmission is performed using a pattern thereafter. The pattern is generated on the basis of the N-th transmission. Without a correlation between N-th and N+1-th operations, a new pattern may be adapted from the N+1-th operation. This selection method has the characteristic of the selection method 1 with respect to transmission up to the N-th transmission and has the characteristic of the selection method 2 from the N+1-th and the following transmission operations. A terminal reports information of N, information of a bitmap table for up to N, and a pattern index (Index) to a reception terminal.

Figure 23:
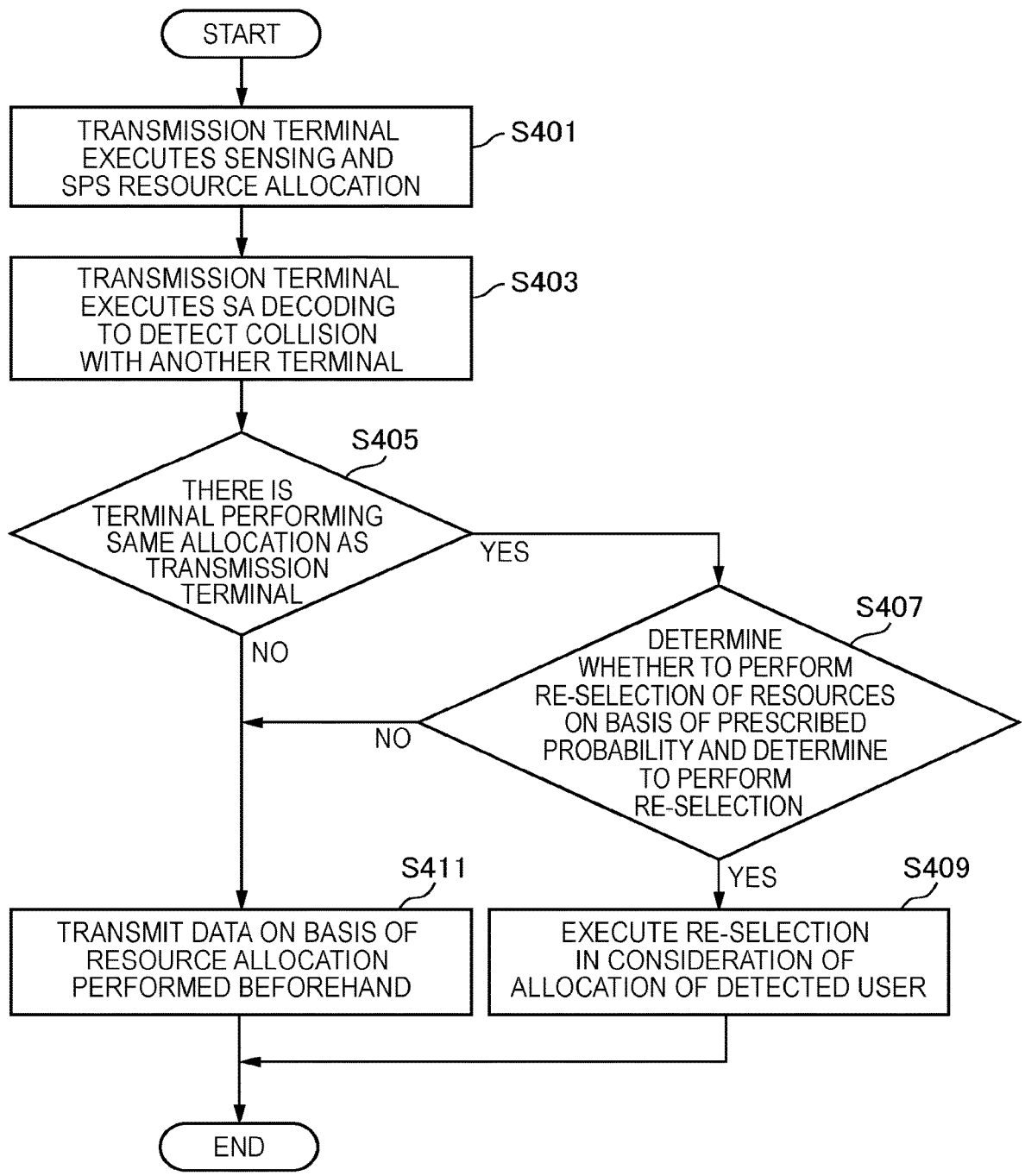
FIG. 23 is an explanatory diagram for describing an example of a resource selection method by a terminal.

Next, the selection method 4 will be described. For example, FIG. 23 is an explanatory diagram for describing an example of a resource selection method by a terminal, illustrating an example of a flow of a series of processes based on the selection method 4. Specifically, a transmission terminal executes sensing and SPS resource allocation (S401). Next, the transmission terminal decodes SA of an area other than an area in which the transmission terminal performs transmission within an "SA period" in which the transmission terminal transmits SA (S403). In a case in which the transmission terminal finds a terminal performing the same allocation (YES in S405), the transmission terminal determines whether or not to perform reselection (e.g., re-allocation of resources) on the basis of a probability a prescribed for determining whether or not to perform reselection (S407). In a case in which performing reselection is determined (YES in S407), the transmission terminal executes reselection. The reselection is executed in consideration of an allocation situation of another newly detected user (S409). In a case in which reselection fails in being on time in the "SA period" of the original 1st transmission, a change will be adapted in the following "SA periods." In this case, SA is re-transmitted to change allocation. Note that any of the selection methods 1 to 3 may be used to report the allocation result. Note that, in a case in which the transmission terminal finds no terminal performing the same allocation (NO in S405) or reselection is not performed (NO in S407), the transmission terminal transmits data on the basis of resource allocation performed beforehand (S411).

Figure 24:
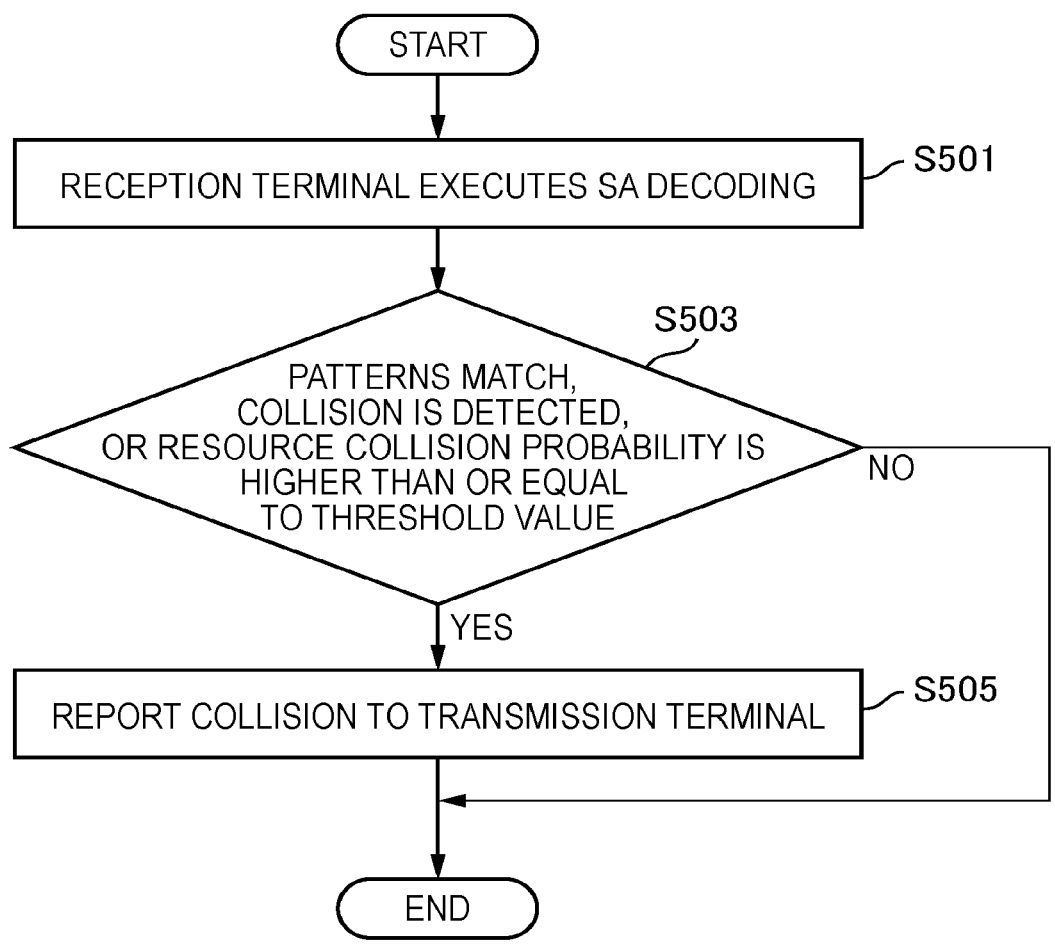
FIG. 24 is an explanatory diagram for describing an example of a resource selection method by a terminal.

Next, the selection method 5 will be described. For example, FIG. 24 is an explanatory diagram for describing an example of a resource selection method by a terminal, illustrating an example of a flow of a series of processes based on the selection method 5. Specifically, a reception terminal (any of a neighboring terminal, the base station, and the RSU is possible) decodes SA (S501), and in a case in which a collision is detected (YES in S503), the reception terminal reports a collision to a transmission terminal. Here, determination of a collision will be described. A collision may be determined using, for example, whether pattern IDs are the same in a case in which patterns are used (S505). In addition, in a case of random selection, a collision may be determined by calculating a collision rate and setting the collision rate to a prescribed threshold value β. In addition, as signaling to be reported, a "Collision indicator," a "collision (Collision) rate (i.e., how much a collision is occurring)," "transmission terminal ID (i.e., which is colliding with which)," and a "location of resources on which a collision (Collision) occurs (e.g., an "SA period" number, a single frequency network (SFN) number, etc.)" are exemplified.

3.3. Control at Time of SA Decoding Failure

Next, an example of control in a case in which SA decoding fails in SPS will be described. In the case in which SA decoding fails in SPS, there is a possibility of data reception failing thereafter. Thus, a mechanism that can recover the failure of SA decoding is necessary.

(a) Method of Executing Retransmission of SA within SPS Period

Figure 25:
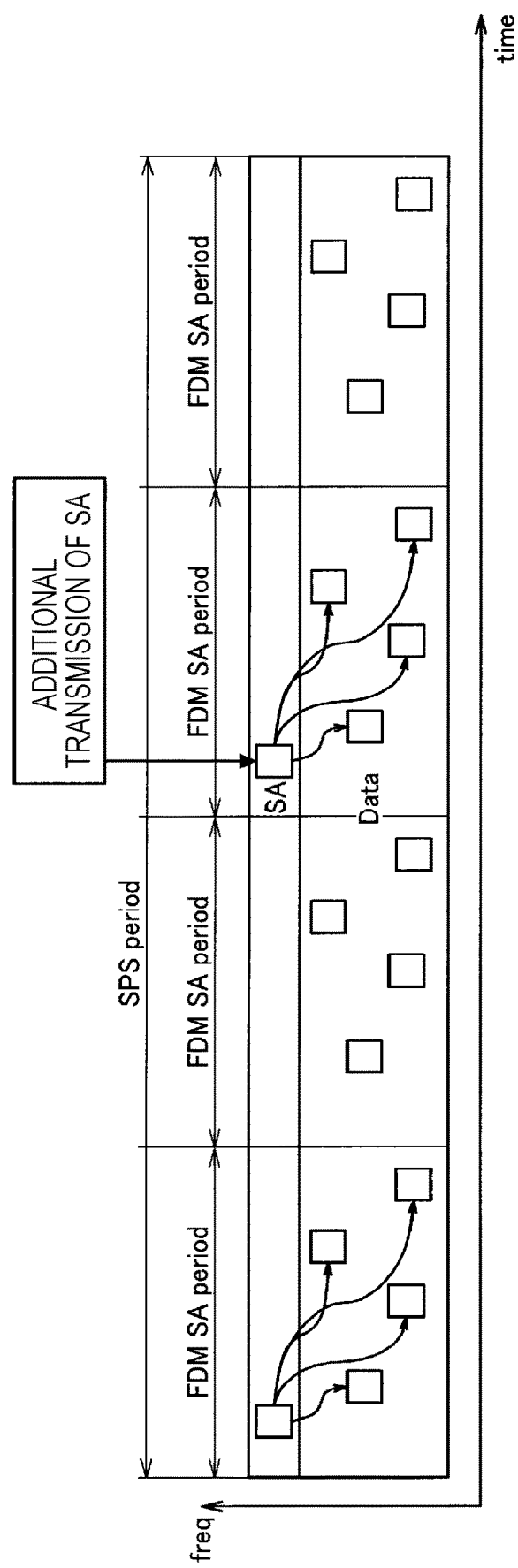
FIG. 25 is a diagram illustrating an example of a case in which SA is retransmitted within an SPS period.

First, a method of executing retransmission of SA within an "SPS period" will be described. For example, FIG. 25 illustrates an example of a case in which SA is retransmitted within an "SPS period." As illustrated in FIG. 25, a transmission terminal may execute additional transmission of SA to a terminal that has received SA of SPS.

Note that a condition for performing additional transmission may be set. For example, additional transmission of SA may be executed with respect to a terminal whose "SPS period" is longer than or equal to a certain threshold value. In this case, the threshold value may be reported from, for example, the base station, or may be set in advance (Preconfigured).

In addition, as another example, in a case in which a resource occupancy rate of a resource pool is equal to or lower than a threshold value (i.e., a resource pool is empty), additional transmission of SA may be executed. In this case, the transmission terminal executes sensing in order to detect the congestion of the resource pool. Note that the sensing may be "Energy sensing" or "SA decoding." In addition, the threshold value may be reported from, for example, the base station or set in advance (Preconfigured).

In addition, as another example, additional transmission may be restricted with random numbers on the basis of a probability y prescribed for determining whether or not to perform additional transmission of SA so that retransmission will not be performed to everyone. Note that the probability y may be reported from, for example, the base station, or may be set in advance (Preconfigured).

In addition, the terminal that has determined additional transmission selects resources for retransmitting SA. In the case of Mode 1, for example, the terminal transmits a "Scheduling request" to the base station. In this case, the base station instructs SA resources for retransmission to the terminal, or reports "Timing offset" information from the first transmission to the transmission terminal. Note that, in the case in which the "Timing offset" information from the first transmission is reported to the transmission terminal, a frequency direction is fixed. In addition, as another example, in the case of Mode 2, the terminal autonomously selects resources.

Next, additionally transmitted SA will be described. For example, a terminal may correct a change point from SA of the 1st transmission and transmit SA. As a specific example, the terminal reports the number of "SA periods" included in SPS or the like by subtracting an amount already transmitted. In addition, as another example, the terminal may put information representing SA for retransmission into SA to be retransmitted. In addition, information regarding a first SA transmission timing may also be reported. In this case, a terminal that has received the information predicts the number of remaining transmission operations from the first SA transmission timing and a reception timing of retransmitted SA.

(b) Method of Transmitting SA Repetition Across SA Period

Next, a method of transmitting "SA repetition" across an "SA period" will be described. SA is repeatedly transmitted (Repetition). According to a D2D standard, transmission is repeated (Repetition) two times with an "SA pool" within an "SA period." This repeated (Repetition) transmission may be performed with the "SA pool" in the middle of the "SPS period" from the beginning, not in SA of the 1$^{st}$ transmission. A location of the repetition (Repetition) is reported from the base station in the case of Mode 1, and selected by the terminal by itself in the case of Mode 2.

(c) Method of Performing SA Retransmission or Repetition (Repetition) with Different Resource Pools Next, a method of performing SA retransmission or repetition (Repetition) with different resource pools will be described. This method is to perform transmission in a plurality of resource pools (Resource pool) for gaining diversity.

Figure 26:
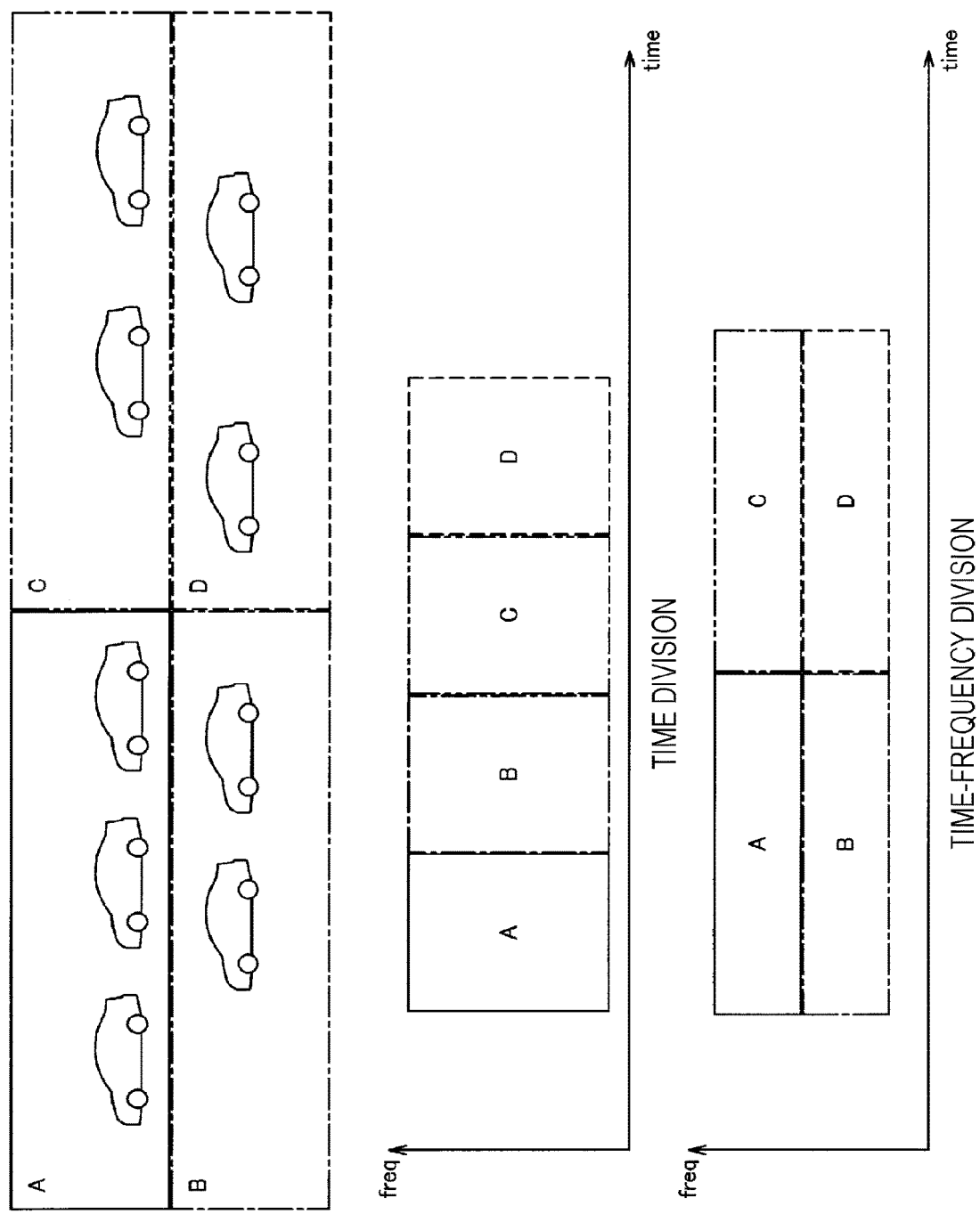
FIG. 26 is an explanatory diagram for describing an example of resource allocation using geo-location information.

For example, FIG. 26 is an explanatory diagram for describing an example of resource allocation using "Geo-location information." As illustrated in FIG. 26, in a case in which "Geo-location-based resource allocation" is used, different resource pools (Resource pool) are used in proximity. A normal reception side monitors a plurality of pools (Pool) in its peripheral areas to receive signals from a transmission terminal without failure. On the other hand, a transmission side performs transmission basically using a resource pool allocated to its own position. When SPS is transmitted, the transmission side performs transmission across a plurality of resource pools in order to prevent the reception side from failing in decoding.

As transmission patterns, there are three patterns as follows. First, in pattern 1, SA and Data are transmitted using resource pools allocated to the position of the transmission terminal. Furthermore, SA and Data are transmitted using resource pools allocated to a peripheral position.

In addition, in pattern 2, SA and Data are transmitted using resource pools allocated to the position of the transmission terminal. Furthermore, SA is transmitted using resource pools allocated to a peripheral position.

In addition, in pattern 3, SA and Data are transmitted using resource pools allocated to the position of the transmission terminal. Furthermore, Data is transmitted using resource pools allocated to a peripheral position.

The transmission terminal may report resource pool information for performing next transmission using SA to be transmitted using resource pools allocated to the position of the transmission terminal. A reception terminal that has received this SA monitors the resource pools designated at the time of the next SPS transmission. In addition, information transmitted in the SA may be information of a resource pool for simultaneously performing transmission or information of a resource block to which transmission is actually allocated. In addition, it may be information of a resource block for the next transmission.

(c-1) Activation (Activation) Method

Next, an activation (Activation) method will be described.

In the case of Mode 1, for example, a terminal receives a report of a configuration instruction of multiple pool transmission, peripheral resource pool information, and resource information for transmitting SA using a peripheral resource pool.

In addition, in the case of Mode 2, the terminal makes determination by itself. As a specific example, activation may be performed targeting a terminal whose "SPS period" is greater than or equal to a certain threshold value. Note that the threshold value may be reported from, for example, the base station, or may be set in advance (Preconfigured).

In addition, as another example, in a case in which a resource occupancy rate of a resource pool is equal to or lower than a threshold value (i.e., the resource pool is empty), activation may be performed. In this case, the transmission terminal executes sensing to detect the congestion of the resource pool. Note that the sensing may be "Energy sensing" or "SA decoding." In addition, for example, the threshold value may be reported from, the base station, or may be set in advance (Preconfigured).

In addition, as another example, additional transmission may be restricted with random numbers on the basis of a probability y prescribed for determining whether or not to perform additional transmission of SA so that retransmission will not be performed to everyone. Note that the probability y may be reported from, for example, the base station, or may be set in advance (Preconfigured).

3.4. Operation of Reception Terminal

Next, an operation of a reception terminal will be described.

(a) Reception Restriction of PSCCH and PSSCH with Respect to Reception Terminal

In the case of FDM, there are cases in which SA and Data are transmitted in the same subframe (Subframe), and thus it is basically necessary for a reception terminal to decode all SA and Data. Thus, if a bandwidth becomes wide, bands that have to be decoded increases, which increases a load imposed on the reception terminal. For this reason, a mechanism for restricting a decoding range of a PSCCH and a PSSCH needs for each terminal. Note that, in the present description, restriction on a decoding range of a PSCCH will be described.

Figure 27:
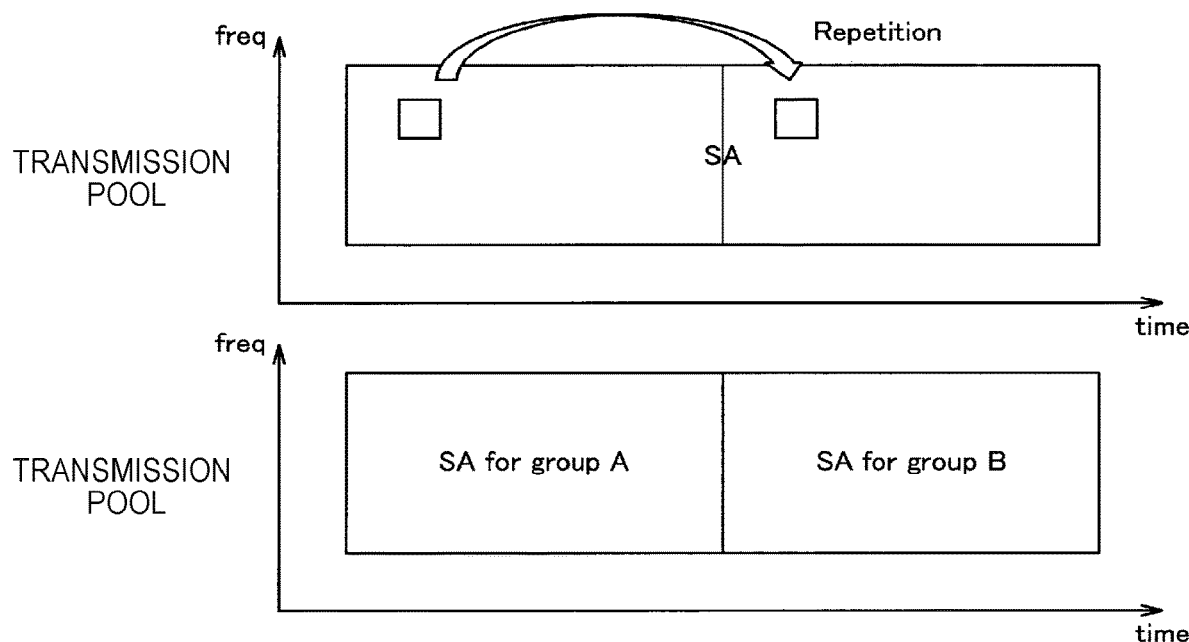
FIG. 27 is a diagram illustrating a configuration example regarding grouping of a transmission pool and a reception pool.

First, in a reception resource pool, grouping of terminals is introduced. For example, FIG. 27 illustrates a configuration example regarding grouping of a transmission pool and a reception pool. A terminal performs partitioning (Partitioning) on SA areas within a reception resource pool for each allocated group and decodes only a target partition (Partition). A transmission side performs transmission to enable all groups (Group) of reception terminals to receive data in a transmission resource pool. For example, in FIG. 27, transmission is performed two times with respect to a group A and a group B in different times.

Note that grouping may be performed using, for example, terminal IDs or RNTIs. In addition, as another example, group information regarding grouping may be reported from the base station.

(b) Data Decoding Priority Setting of Reception Terminal

Next, an example of a mechanism for determining which data should be decoded with priority in a case in which it is determined that data areas overlap as a result of SA decoding will be described. Note that the circumstance is likely to happen, for example, in the case of random selection as well.

As a specific example, in a case in which one or more pieces of data are determined to overlap on the same resource as a result of SA decoding, a terminal may select a packet to be decoded in accordance with a priority control unit table. Note that, in addition, the priority control unit table may be provided from, for example, the base station, or may be set in advance (Preconfigured).

In addition, as another example, a transmission terminal may cause traffic type information of a packet to be included in SA. In this case, a reception terminal may change a level of priority in accordance with the traffic type information.

In addition, as another example, a level of priority may be set in accordance with a transmission method. As a specific example, different levels of priority may be set for SPS and others. In addition, as another example, levels of priority may be set in accordance with an MCS or an RV.

In addition, as another example, levels of priority may be controlled using the number of retransmission (Retransmission) operations. For example, a packet that is likely to be retransmitted (Retransmission) in the future may be decoded with a lower level of priority.

In addition, as another example, decoding may be performed by comparing with a signal-to-interference noise ratio (SINR) of previous data transmission. For example, data having a higher SINR may be decoded with priority. In this case, data having a higher decoding probability is selected.

3.5. Others (a) Congestion (Congestion) Countermeasure 1

Next, a first countermeasure to congestion (Congestion) will be described. In a case in which traffic increases, congestion occurs unless transmission control is performed, and there are cases in which a packet error rate increases. Thus, a "Congestion control" mechanism is necessary for the base station or a terminal side.

(a-1) Congestion Control in Mode 1

Figure 28:
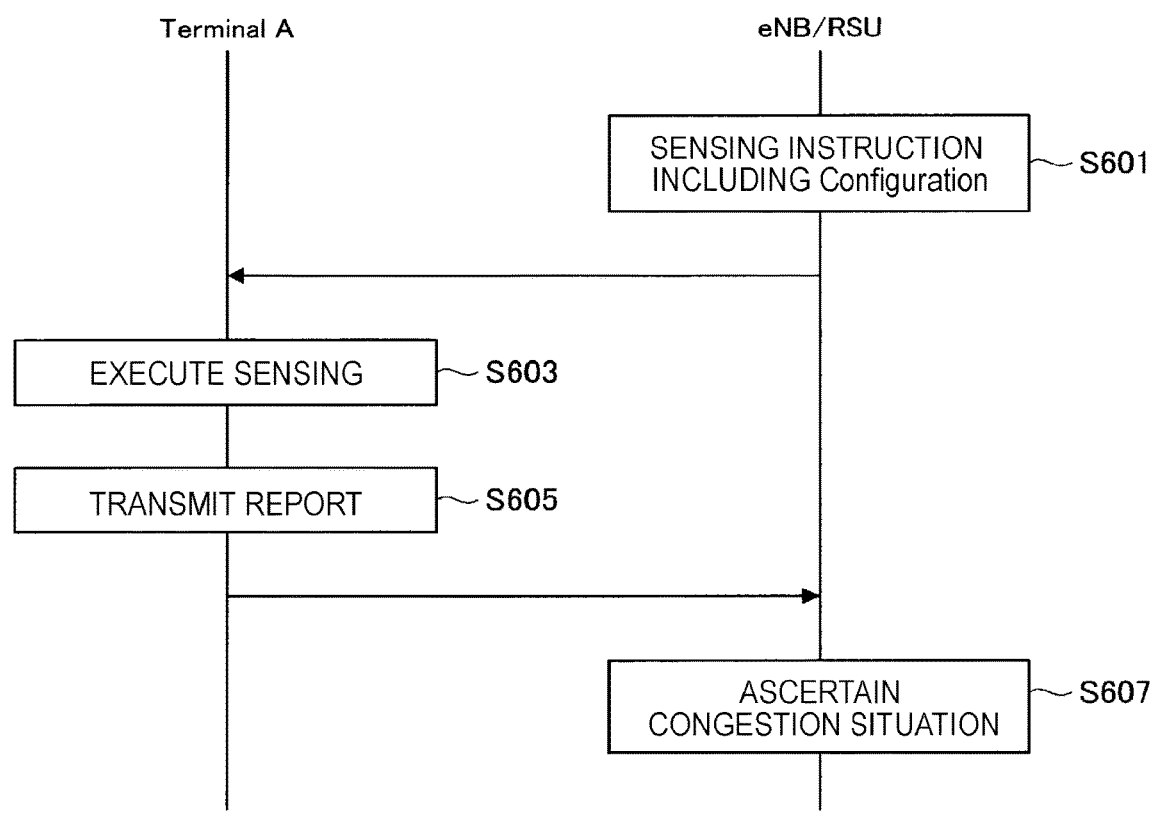
FIG. 28 is a flowchart illustrating an example of a flow of a series of processes of congestion control.

First, "Congestion control" in Mode 1 will be described. In the case of Mode 1, the base station executes "Congestion control." For example, FIG. 28 is a flowchart illustrating an example of a flow of a series of processes of "Congestion control." Specifically, first, the base station causes each vehicle to execute sensing (S601 and S603) to ascertain a radio communication use rate, and receives reports of a congestion situation of radio communication (S605). Accordingly, the base station can ascertain the congestion (S607). Then, the base station sets a restriction on resource allocation in accordance with the congestion. In addition the base station controls a level of priority of the resource allocation in accordance with the priority of packets.

(a-2) Congestion Control in Mode 2

Next, "Congestion control" in Mode 2 will be described. In Mode 2, processing differs between a case in which there is support of the base station and a case in which there is no support of the base station.

For example, in the case in which there is support of the base station, a terminal changes control of packet transmission in accordance with a report on a congestion situation from the base station. Specifically, first, similarly to the example illustrated in FIG. 28, the base station receives reports on sensing results from each terminal in order to ascertain the congestion. After ascertaining the congestion situation, the base station performs "reporting of a level of congestion" and "reporting of a packet transmission probability a" with respect to each terminal.

A terminal that has received "reporting of a level of congestion" sets a restriction on resource allocation in accordance with the congestion indicated by the level of congestion. In addition, the terminal controls a level of priority of the resource allocation in accordance with the priority of packets.

In addition, a terminal that has received "reporting of a packet transmission probability a" determines whether or not to perform transmission on the basis of the transmission probability a when packets are transmitted. Note that, at this time, the terminal may exclude packets having a certain level of priority or higher.

In addition, in the case in which there is no support of the base station, a terminal may periodically execute sensing in order to ascertain a level of congestion. In this case, for example, the terminal may determine congestion if a sensing result is higher than a pre-set (Preconfigured) threshold value. In addition, in a congested state, the terminal determines whether or not to perform transmission using the packet transmission probability a set in advance (Preconfigured).

(b) Congestion (Congestion) Countermeasure 2

Next, a second countermeasure to congestion (Congestion) will be described. As described above, in the case in which traffic increases, congestion occurs unless transmission control is performed, and there are cases in which a packet error rate increases. Under such a circumstance, if a plurality of "SA pools" are set to be divided into "Traffic type," V2X link, or the like, there are cases in which flexibility is lost and a resource use efficiency deteriorates. Thus, at the time of congestion (Congestion), "SA pools" are configured to be set (Configurable) in accordance with a situation to make good use of resources.

As a specific example, a case in which two "SA Pools" for "Event trigger traffic" and "Periodical traffic" are defined will be focused on. In this case, for example, in a case in which a pool for "Periodical traffic" is congested and a pool for "Event trigger traffic" is empty, a transmission terminal temporarily uses the pool for "Event trigger traffic.

(b-1) Operation and Signaling in Mode 1

Here, an operation and signaling in Mode 1 will be described. In the case of Mode 1, for example, the base station ascertains a congestion situation of each of "SA pools" on the basis of a similar method to that of the example illustrated in FIG. 28. If a relative congestion ratio in the pool is higher than or equal to a threshold value, the base station allocates an "SA pool" with a low congestion level as a part of an "SA pool" with a high congestion level. Then, the base station rewrites configuration (Configuration) information of the "SA pools" and reports the information to the terminal.

(b-2) Operation and Signaling in Mode 2

Next, an operation and signaling in Mode 2 will be described. In Mode 2, processing differs between the case in which there is support of the base station and the case in which there is no support of the base station.

In the case in which there is support of the base station, for example, a terminal changes SA to be used in accordance with a report on a congestion situation from the base station. Specifically, first, the base station receives reports of sensing results from each terminal to ascertain congestion, similarly to the example illustrated in FIG. 28. After ascertaining the congestion situation, the base station performs "reporting of a level of congestion" to each terminal.

The terminal that has received the "reporting of a level of congestion" rewrites control defined in each available "SA pool" (in other words, an application of the "SA pool") in accordance with the congestion indicated by the level of congestion. The terminal can use an "SA pool" for "Periodical traffic," for example, even for "Event trigger" (i.e., can perform transmission of SA) on the basis of the control.

In addition, in the case in which there is no support of the base station, the terminal may periodically execute sensing to ascertain a level of congestion. In this case, for example, the terminal may determine congestion if a sensing result is higher than a pre-set (preconfigured) threshold value. In addition, in a congested state, the terminal may rewrite control defined for an available "SA Pool" (in other words, an application of the "SA pool").

(c) Countermeasure to IBE

Next, a countermeasure to IBE will be described. In FDM allocation, there are cases in which the problem of IBE occurs if allocation of a plurality of users to the same subframe is made. On the other hand, in a case in which only a single user is allocated, there are cases in which resources are not fully used, which results in a waste of resources.

Thus, as a countermeasure to IBE, muting (Muting) of resources is performed among resources. However, this is not applied to a case in which a user's own resources are adjacent. In the case of Mode 1, the base station first divides transmission terminals and reception terminals into several groups, and allocates resources to each of the groups. Group allocation is set such that IBE is minimized as much as possible. In a case in which groups that are likely to cause IBE are allocated in the same time, IBE can be reduced by muting resources of the groups.

Figure 29:
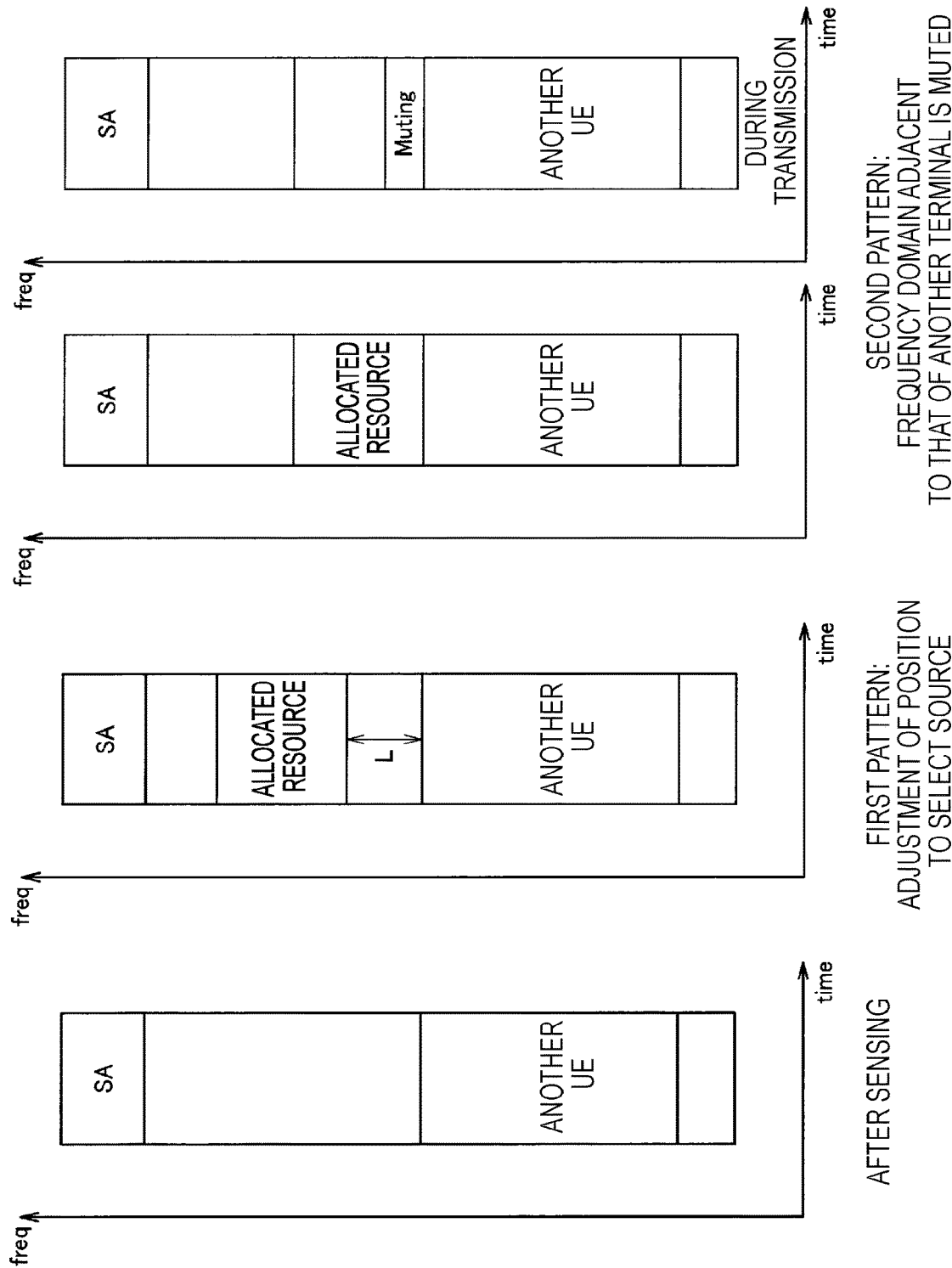
FIG. 29 is a diagram illustrating an example of resource allocation in Mode 2 in consideration of a countermeasure to IBE.

In addition, the case of Mode 2 will be described with reference to FIG. 29. FIG. 29 illustrates an example of resource allocation in Mode 2 in consideration of a countermeasure to IBE. For example, as a first pattern, there is a method of selecting a resource separated from an allocation position of another terminal by a distance L in the frequency direction. Note that the separation distance L in the frequency direction may be allocated by the base station, or may be set in advance (Preconfigured). In addition, the distance L in the frequency direction may be changed in accordance with congestion. In addition, the distance L in the frequency direction may be set depending on an allocation area of another terminal. As a specific example, the distance L in the frequency direction may be set such that resources are separated farther as an allocation area of another terminal becomes greater. In addition, the distance L in the frequency direction may be defined in units of resource blocks.

In addition, as a second pattern, there is a method in which, although a resource adjacent to an allocation position of another terminal (L=0) is selected, a frequency domain adjacent to that of the other terminal is muted (Muting) during transmission. Note that the range in the frequency direction to be muted (which will also be referred to as "a muting amount" below) may be set in advance before the selection of resources. In addition, an allocation amount of physical resource blocks (PRBs) is calculated in consideration of the muting amount. In addition, the muting amount may be allocated by the base station, or may be set in advance (Preconfigured). In addition, the muting amount may be changed in accordance with congestion. In addition, the muting amount may be set depending on an allocation area of the other terminal. As a specific example, the muting amount may be set to increase more as the allocation area of the other terminal becomes greater.

Note that the above-described countermeasures to IBE are not limited only to SPS.

4. Application Examples

The technology of the present disclosure is applicable to various products. For example, the eNB 30 may be realized as any type of evolved Node B (eNB) such as a macro eNB, and a small eNB. A small eNB may be an eNB that covers a cell smaller than a macro cell, such as a pico eNB, micro eNB, or home (femto) eNB. Instead, the eNB 30 may be realized as any other types of base stations such as a NodeB and a base transceiver station (BTS). The eNB 30 may include a main body (that is also referred to as a base station device) configured to control radio communication, and one or more remote radio heads (RRH) disposed in a different place from the main body. Additionally, various types of terminals to be described later may also operate as the eNB 30 by temporarily or semi-permanently executing a base station function. Further, at least some of constituent elements of the eNB 30 may be implemented by the base station device or a module for the base station device.

For example, the UE 10, the UE 20 or the RSU 50 may be realized as a mobile terminal such as a smartphone, a tablet personal computer (PC), a notebook PC, a portable game terminal, a portable/dongle type mobile router, and a digital camera, or an in-vehicle terminal such as a car navigation device. The UE 10, the UE 20 or the RSU 50 may also be realized as a terminal (that is also referred to as a machine type communication (MTC) terminal) that performs machine-to-machine (M2M) communication. Furthermore, at least some of constituent elements of the UE 10, the UE 20 or the RSU 50 may be implemented by a module (such as an integrated circuit module including a single die) mounted on each of the terminals.

4.1. Application Examples with Respect to eNB

First Application Example

Figure 30:
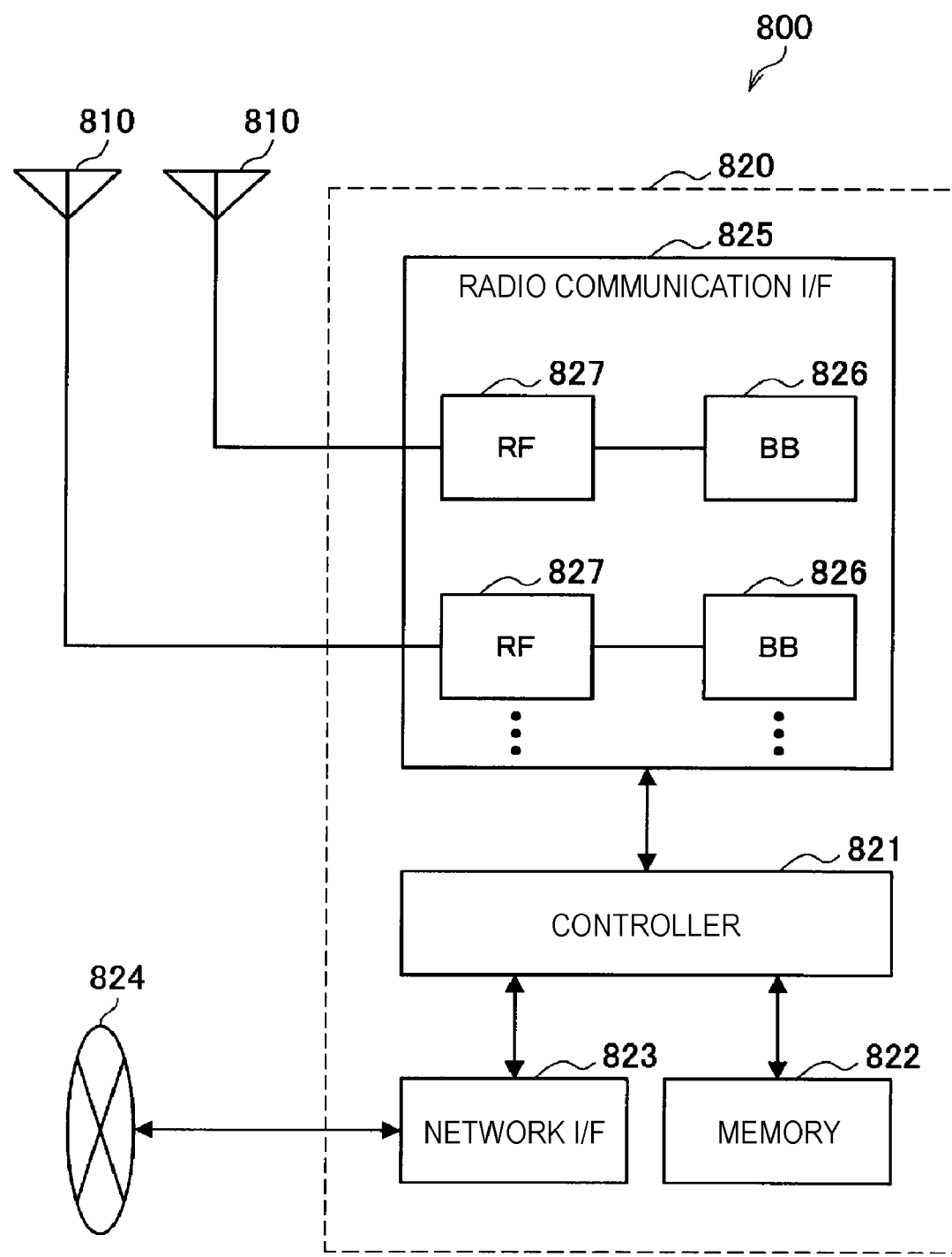
FIG. 30 is a block diagram illustrating a first example of a schematic configuration of an eNB.

FIG. 30 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 30. For example, the multiple antennas 810 may be compatible with multiple frequency bands used by the eNB 800. Note that although FIG. 30 illustrates the example in which the eNB 800 includes the multiple antennas 810, the eNB 800 may also include a single antenna 810.

The base station device 820 includes a controller 821, a memory 822, a network interface 823, and a radio communication interface 825.

The controller 821 may be, for example, a CPU or a DSP, and operates various functions of a higher layer of the base station device 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. In addition, the controller 821 may have logical functions of performing control such as radio resource control, radio bearer control, mobility management, admission control, and scheduling. In addition, the control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP) for example). The BB processor 826 may have a part or all of the above-described logical functions instead of the controller 821. The BB processor 826 may be a memory that stores a communication control program, or a module that includes a processor and a related circuit configured to execute the program. Updating the above program may allow the functions of the BB processor 826 to be changed. The above module may be a card or a blade that is inserted into a slot of the base station device 820. Alternatively, the module may also be a chip that is mounted on the above card or the above blade. Meanwhile, the RF circuit 827 may include, for example, a mixer, a filter, an amplifier, and the like and transmits and receives radio signals via the antenna 810.

The radio communication interface 825 may include the multiple BB processors 826, as illustrated in FIG. 30. For example, the multiple BB processors 826 may be compatible with multiple frequency bands used by the eNB 800. In addition, the radio communication interface 825 may include the multiple RF circuits 827, as illustrated in FIG. 30. For example, the multiple RF circuits 827 may be compatible with multiple antenna elements. Note that although FIG. 30 illustrates the example in which the radio communication interface 825 includes the multiple BB processors 826 and the multiple RF circuits 827, the radio communication interface 825 may also include a single BB processor 826 or a single RF circuit 827.

In the eNB 800 illustrated in FIG. 30, the processing unit 350 described with reference to FIG. 13 may be implemented by the radio communication interface 825 (e.g., the BB processors 826) or the controller 821. In addition, the radio communication unit 320 may be implemented by the radio communication interface 825 (e.g., the RF circuits 827). In addition, the antenna unit 310 may be implemented by the antennas 810. In addition, the network communication unit 330 may be implemented by the controller 821 and/or the network interface 823. In addition, the storage unit 340 may be implemented by the memory 822.

Second Application Example

Figure 31:
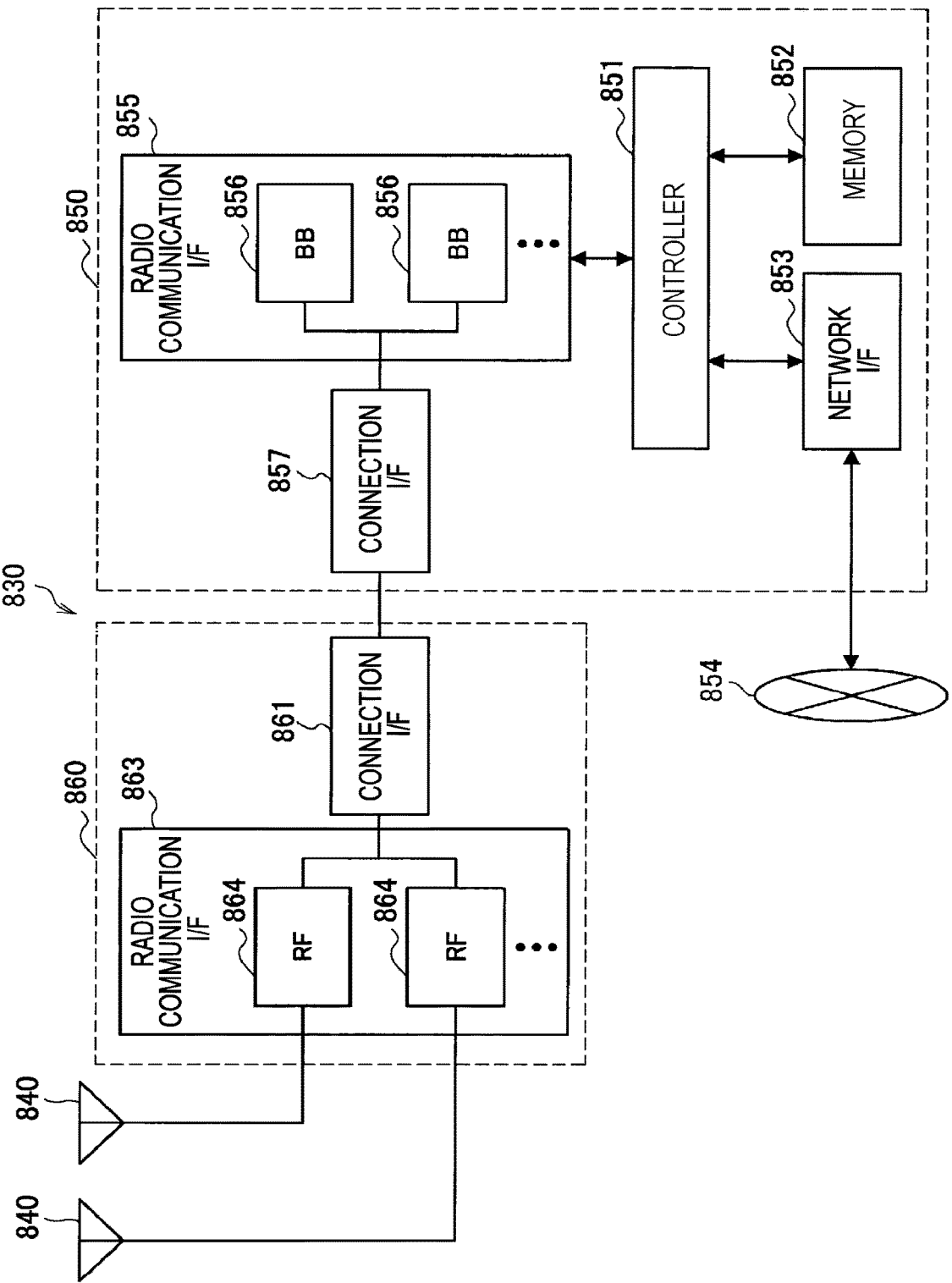
FIG. 31 is a block diagram illustrating a second example of a schematic configuration of an eNB.

FIG. 31 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. In addition, the base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 31. For example, the multiple antennas 840 may be compatible with multiple frequency bands used by the eNB 830. Note that although FIG. 31 illustrates the example in which the eNB 830 includes the multiple antennas 840, the eNB 830 may also include a single antenna 840.

The base station device 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 30.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856 or the like. The BB processor 856 is the same as the BB processor 826 described with reference to FIG. 30, except the BB processor 856 is connected to the RF circuit 864 of the RRH 860 via the connection interface 857. The radio communication interface 855 may include the multiple BB processors 856, as illustrated in FIG. 31. For example, the multiple BB processors 856 may be compatible with multiple frequency bands used by the eNB 830. Note that although FIG. 31 illustrates the example in which the radio communication interface 855 includes the multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication in the above-described high speed line that connects the base station device 850 (radio communication interface 855) to the RRH 860.

In addition, the RRH 860 includes a connection interface 861 and a radio communication interface 863.

The connection interface 861 is an interface for connecting the RRH 860 (radio communication interface 863) to the base station device 850. The connection interface 861 may also be a communication module for communication in the above-described high speed line.

The radio communication interface 863 transmits and receives radio signals via the antenna 840. The radio communication interface 863 may typically include, for example, the RF circuit 864 or the like. The RF circuit 864 may include, for example, a mixer, a filter, an amplifier, and the like, and transmits and receives radio signals via the antenna 840. The radio communication interface 863 may include multiple RF circuits 864, as illustrated in FIG. 31. For example, the multiple RF circuits 864 may support multiple antenna elements. Note that although FIG. 31 illustrates the example in which the radio communication interface 863 includes the multiple RF circuits 864, the radio communication interface 863 may also include a single RF circuit 864.

In the eNB 830 illustrated in FIG. 31, the processing unit 350 described with reference to FIG. 13 may be implemented by the radio communication interface 855, the radio communication interface 863, and/or the controller 851. In addition, the radio communication unit 320 may be implemented by the radio communication interface 863 (e.g., the RF circuits 864). In addition, the antenna unit 310 may be implemented by the antennas 840. In addition, the network communication unit 330 may be implemented by the controller 851 and/or the network interface 853. In addition, the storage unit 340 may be implemented by the memory 852.

4.2. Application Examples with Respect to UE and RSU

First Application Example

Figure 32:
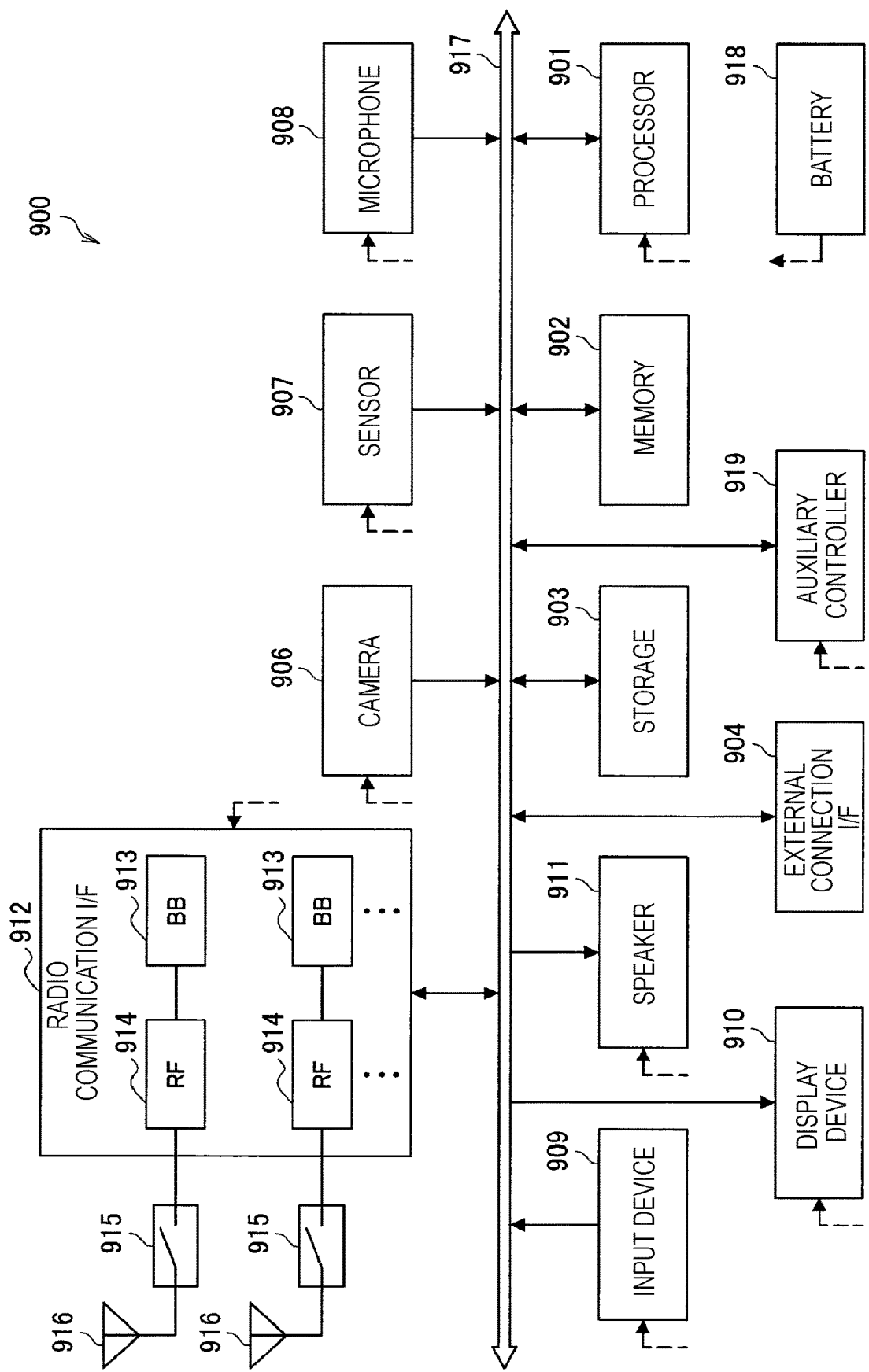
FIG. 32 is a block diagram illustrating an example of a schematic configuration of a smartphone.

FIG. 32 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, a switch, or the like, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913, an RF circuit 914, and the like. The BB processor 913 may perform, for example, encoding/decoding, modulating/demodulating, multiplexing/demultiplexing, and the like, and performs various types of signal processing for radio communication. Meanwhile, the RF circuit 914 may include, for example, a mixer, a filter, an amplifier, and the like, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 32. Note that although FIG. 32 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance radio communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 32. Note that although FIG. 32 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 32 via feeder lines, which are partially shown as dashed lines in the figure. The auxiliary controller 919 operates a minimum necessary function of the smartphone 900, for example, in a sleep mode.

In the smartphone 900 illustrated in FIG. 32, the processing unit 150 described with reference to FIG. 11, the processing unit 250 described with reference to FIG. 12, or the processing unit 540 described with reference to FIG. 14 may be implemented by the radio communication interface 912 or the processor 901. In addition, the radio communication unit 120, the radio communication unit 220, or the radio communication unit 520 may be implemented by the radio communication interface 912 (e.g., the RF circuits 914). In addition, the GNSS signal processing unit 130 or the GNSS signal processing unit 230 may be implemented by the sensor 907. In addition, the antenna unit 110, the antenna unit 210, or the antenna unit 510 may be implemented by the antennas 916. In addition, the storage unit 140, the storage unit 240, or the storage unit 530 may be implemented by the memory 902.

Second Application Example

FIG. 33 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as an LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example, a BB processor 934, an RF circuit 935, and the like. The BB processor 934 may perform, for example, encoding/decoding, modulating/demodulating, multiplexing/demultiplexing, and the like, and performs various types of signal processing for radio communication. Meanwhile, the RF circuit 935 may include, for example, a mixer, a filter, an amplifier, and the like, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 33. Note that although FIG. 33 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance radio communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation device 920 may include the multiple antennas 937, as illustrated in FIG. 33. Note that although FIG. 33 illustrates the example in which the car navigation device 920 includes the multiple antennas 937, the car navigation device 920 may also include a single antenna 937.

Furthermore, the car navigation device 920 may include the antenna 937 for each radio communication scheme. In that case, the antenna switches 936 may be omitted from the configuration of the car navigation device 920.

The battery 938 supplies power to each block of the car navigation device 920 illustrated in FIG. 33 via feeder lines that are partially shown as dashed lines in the figure. In addition, the battery 938 accumulates power supplied from the vehicle.

In the car navigation device 920 illustrated in FIG. 33, the processing unit 150 described with reference to FIG. 11, the processing unit 250 described with reference to FIG. 12, or the processing unit 540 described with reference to FIG. 14 may be implemented by the radio communication interface 933 or the processor 921. In addition, the radio communication unit 120, the radio communication unit 220, or the radio communication unit 520 may be implemented by the radio communication interface 933 (e.g., the RF circuits 935). In addition, the GNSS signal processing unit 130 or the GNSS signal processing unit 230 may be implemented by the GPS module 924. In addition, the antenna unit 110, the antenna unit 210, or the antenna unit 510 may be implemented by the antennas 937. In addition, the storage unit 140, the storage unit 240, or the storage unit 530 may be implemented by the memory 922.

In addition, the technology of the present disclosure may also be realized as an in-vehicle system (or a vehicle) 940 including one or more blocks of the above car navigation device 920, the in-vehicle network 941, and a vehicle module 942. That is, the in-vehicle system (or a vehicle) 940 may be provided as a device having the processing unit 250 described with reference to FIG. 12.

5. Conclusion

Details of embodiments of the present disclosure have been described above with reference to FIGS. 1 to 33.

As described above, during an operation in Mode 1, the base station according to the present embodiment allocates resources in SPS for inter-terminal communication (i.e., V2X communication) performed between a plurality of terminal devices and performs control such that control information regarding the allocation of resources is transmitted to the terminal devices via radio communication. In addition, during an operation in Mode 2, the terminal device according to the present embodiment allocates resources in SPS from a predetermined resource pool for inter-terminal communication (i.e., V2X communication) performed with another terminal device and performs control such that control information regarding the allocation of resources is transmitted to the other terminal device via radio communication. With the above-described configuration, the radio communication system according to the present embodiment can efficiently use resources by applying SPS also to V2X communication and further can expand capacities.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A base station including:

a communication unit configured to perform radio communication; and a processing unit configured to allocate resources in semi-persistent scheduling for inter-terminal communication performed between a plurality of terminal devices and perform control such that control information regarding the allocation of the resources is transmitted to the terminal devices via the radio communication.

(2)

The base station according to (1), in which, in a case in which multicarrier communication is supported, the processing unit performs control such that target component carrier information is reported in association with the control information.

(3)

The base station according to (1) or (2), in which the processing unit allocates the resources from a predetermined resource pool and performs control such that information regarding the resource pool is reported in association with the control information.

(4)

The base station according to (3), including:

an acquisition unit configured to acquire position information of the terminal devices from the terminal devices, in which the processing unit allocates the resources from the resource pool in accordance with the acquired position information of the terminal devices to the terminal devices.

(5)

The base station according to (4), in which the processing unit sets semi-persistent scheduling with respect to the resource pool in accordance with a prediction result of future positions of the terminal devices based on the acquired position information of the terminal devices, and performs control such that information regarding the resource pool is reported to the terminal devices.

(6)

The base station according to any one of (1) to (5), in which the processing unit performs control such that information regarding a stop period of a case in which semi-persistent scheduling is temporarily stopped is reported in association with the control information.

(7)

The base station according to any one of (1) to (6), in which, in a case in which semi-persistent scheduling is released or reconfigured, the processing unit performs control such that information regarding a result of the release or reconfiguration is reported to the terminal devices.

(8)

The base station according to any one of (1) to (7), in which the processing unit performs control such that information regarding a period from when a first terminal device among the plurality of terminal devices transmits the control information to when the first terminal device additionally transmits the control information to at least some of one or more second terminal devices to which the control information has been transmitted is reported to the first terminal device.

(9)

A terminal device including:

a communication unit configured to perform radio communication; and a processing unit configured to allocate resources in semi-persistent scheduling from a predetermined resource pool for inter-terminal communication performed with another terminal device and perform control such that control information regarding the allocation of the resources is transmitted to the other terminal device via the radio communication.

(10)

The terminal device according to (9), in which the processing unit performs sensing on a use situation of the resources and allocates the resources for the inter-terminal communication in accordance with a result of the sensing.

(11)

The terminal device according to (10), in which the processing unit performs control such that a bitmap table in accordance with the allocation of the resources is transmitted to the other terminal device as the control information.

(12)

The terminal device according to (10), in which the processing unit selects a predetermined transmission pattern to be applied from candidates for the transmission pattern for the allocation of the resources on a basis of the result of the sensing and performs control such that information regarding the selected transmission pattern is transmitted to the other terminal device.

(13)

The terminal device according to (12), in which the processing unit in a case in which N is set to a natural number, arbitrarily allocates the resources on the basis of the result of the sensing for transmission up to an N-th transmission among transmission operations with respect to the other terminal device and allocates the resources in accordance with the transmission pattern for an N+1-th and the following transmission operations, and performs control such that information regarding the number of transmission operations N in which the resources are arbitrarily allocated, a bitmap table in accordance with the allocation of the resources for transmission up to the N-th transmission, and information regarding the selected transmission pattern are transmitted to the other terminal device.

(14)

The terminal device according to (10), in which the processing unit detects another terminal device which collides with at least some of the allocated resources and executes re-allocation of the resources in accordance with a detection result.

(15)

The terminal device according to (10), including:

an acquisition unit configured to acquire information in accordance with a detection result of another terminal device which collides with at least some of the allocated resources from an external device, in which the processing unit executes re-allocation of the resources on a basis of the acquired information in accordance with the detection result.

(16)

The terminal device according to (15), in which the acquisition unit acquires at least any information of presence or absence of the collision, a degree of the collision, information regarding the other terminal device with which the collision has occurred, and the resources on which the collision has occurred as the information in accordance with the detection result.

(17)
The terminal device according to any one of (9) to (16), in which the processing unit
sets a transmission period for performing transmission of the control information and transmission of data via the resources allocated using the control information on a basis of a frequency division multiplexing method, and
performs control such that information regarding the set transmission period is reported to the terminal device.
(18)
The terminal device according to any one of (9) to (16), in which the processing unit
sets an offset value in accordance with a period until data transmitted via the resources allocated using the control information is re-transmitted, and
performs control such that information regarding the set offset value is reported to the terminal device.
(19)
The terminal device according to any one of (9) to (16), in which the processing unit
sets an offset value between a period in which the control information is transmitted and a period in which data is transmitted via the resources allocated using the control information, and
performs control such that information regarding the set offset value is reported to the other terminal device.
(20)
The terminal device according to any one of (9) to (19), in which the processing unit performs control such that the control information is additionally transmitted to at least some of one or more other terminal devices to which the control information has been transmitted on a basis of a predetermined condition.
(21)
The terminal device according to any one of (9) to (20), in which, among a plurality of different resource pools set to transmit the control information, the processing unit allocates a second resource pool as a part of a first resource pool in accordance with a situation of congestion of the first resource pool.
(22)
The terminal device according to any one of (9) to (21), in which, among a plurality of resource pools for different applications set to transmit the control information, the processing unit changes an application of a second resource pool in accordance with a situation of congestion of a first resource pool.
(23)
The terminal device according to any one of (9) to (22), in which the processing unit restricts the allocation of the resources in accordance with a situation of congestion of a resource pool for allocating the resources.
(24)
A communication method including:
performing radio communication; and
allocating resources in semi-persistent scheduling for inter-terminal communication performed between a plurality of terminal devices and performing control such that control information regarding the allocation of the resources is transmitted to the terminal devices via the radio communication.
(25)
A communication method including:
a communication unit configured to perform radio communication; and
a processing unit configured to allocate resources in semi-persistent scheduling from a predetermined resource pool for inter-terminal communication performed with another terminal device and perform control such that control information regarding the allocation of the resources is transmitted to the other terminal device via the radio communication.

REFERENCE SIGNS LIST

10 UE
110 antenna unit
120 radio communication unit
130 signal processing unit
140 storage unit
150 processing unit
20 UE
210 antenna unit
220 radio communication unit
230 signal processing unit
240 storage unit
250 processing unit
22 mobile object
30 eNB
310 antenna unit
320 radio communication unit
330 network communication unit
340 storage unit
350 processing unit
40 GNSS satellite
50 RSU

The invention claimed is:
1. A base station comprising:
circuitry configured to:
perform radio communication with a plurality of terminal devices;
acquire location information of the plurality of terminal devices from the plurality of terminal devices, respectively;
allocate resources from a predetermined resource pool to at least one of the plurality of terminal devices in semi-persistent scheduling for communication performed between the plurality of terminal devices, the semi-persistent scheduling being set with respect to the resource pool in accordance with a prediction result of future locations of the terminal devices, the future locations of the terminal devices being predicted based on the acquired location information of current locations of the plurality of terminal devices, and moving speed of the terminal devices measured by each of the plurality of terminal devices; and
control a transmission terminal device of the plurality of terminal devices to transmit control information regarding the allocation of the resources to a receiving terminal device of the plurality of terminal devices via the radio communication.
2. The base station according to claim 1, wherein, in a case in which multicarrier communication is supported, the circuitry is configured to control the transmission terminal device of the plurality of terminal devices to report target component carrier information in association with the control information.
3. The base station according to claim 1, wherein the circuitry is configured to control the transmission terminal device of the plurality of terminal devices to report information regarding the resource pool in association with the control information.
4. The base station according to claim 1, wherein the circuitry is configured to control the transmission terminal device of the plurality of terminal devices to report information regarding the resource pool and configuration of the semi-persistent scheduling to the terminal devices.

5. The base station according to claim 1, wherein the circuitry is configured to control the transmission terminal device of the plurality of terminal devices to report information regarding a stop period of a case in which semi-persistent scheduling is temporarily stopped, in association with the control information.

6. The base station according to claim 1, wherein, in a case in which semi-persistent scheduling is released or reconfigured, the circuitry is configured to control the transmission terminal device of the plurality of terminal devices to report information regarding a result of the release or reconfiguration to the terminal devices.

7. The base station according to claim 1, wherein the circuitry is configured to control the transmitting terminal device to transmit additional control information to the receiving terminal device based on semi-persistent scheduling period, or a resource occupancy rate of the resource pool.

8. A terminal device comprising:
circuitry configured to:
perform radio communication with another terminal device;
allocate resources in semi-persistent scheduling from a predetermined resource pool for communication performed with the other terminal device, the semi-persistent scheduling being set with respect to the resource pool in accordance with a prediction result of future location of the terminal device, the future location of the terminal device being predicted based on location information of current location of the terminal device and moving speed of the terminal device measured by the terminal device; and
transmit control information regarding the allocation of the resources to the other terminal device via the radio communication.

9. The terminal device according to claim 8, wherein the circuitry is configured to perform sensing on a use situation of the resources, and allocate the resources for the communication with the other terminal device in accordance with a result of the sensing.

10. The terminal device according to claim 9, wherein the circuitry is configured to transmit a bitmap table in accordance with the allocation of the resources to the other terminal device as the control information.

11. The terminal device according to claim 9, wherein the circuitry is configured to select a predetermined transmission pattern to be applied from candidates for the transmission pattern for the allocation of the resources on a basis of the result of the sensing, and transmit information regarding the selected transmission pattern to the other terminal device.

12. The terminal device according to claim 11, wherein the circuitry is configured to
in a case in which N is set to a natural number, arbitrarily allocate the resources on the basis of the result of the sensing for transmission up to an N-th transmission among transmission operations, with respect to the other terminal device, and allocate the resources in accordance with the transmission pattern for an N+1-th and the following transmission operations, and
transmit information regarding the number of transmission operations N in which the resources are arbitrarily allocated, a bitmap table in accordance with the allocation of the resources for transmission up to the N-th transmission, and information regarding the selected transmission pattern are transmitted to the other terminal device.

13. The terminal device according to claim 9, wherein the circuitry is configured to detect another terminal device which collides with at least some of the allocated resources and execute re-allocation of the resources in accordance with a detection result.

14. The terminal device according to claim 9, wherein the circuitry is configured to acquire information in accordance with a detection result of another terminal device which collides with at least some of the allocated resources from an external device, and execute re-allocation of the resources on a basis of the acquired information in accordance with the detection result.

15. The terminal device according to claim 14, wherein the circuitry is configured to acquire at least any information of presence or absence of the collision, a degree of the collision, information regarding the other terminal device with which the collision has occurred, and the resources on which the collision has occurred as the information in accordance with the detection result.

16. The terminal device according to claim 8, wherein the circuitry is configured to
set a transmission period for performing transmission of the control information and transmission of data via the resources allocated using the control information on a basis of a frequency division multiplexing method, and
report information regarding the set transmission period to the terminal device.

17. The terminal device according to claim 8, wherein the circuitry is configured to
set an offset value in accordance with a period until data transmitted via the resources allocated using the control information is re-transmitted, and
report information regarding the set offset value to the terminal device.

18. The terminal device according to claim 8, wherein the circuitry is configured to
set an offset value between a period in which the control information is transmitted and a period in which data is transmitted via the resources allocated using the control information, and
report information regarding the set offset value to the other terminal device.

19. The terminal device according to claim 8, wherein the circuitry is configured to additionally transmit the control information to at least some of one or more other terminal devices to which the control information has been transmitted on a basis of a predetermined condition.

20. The terminal device according to claim 8, wherein, among a plurality of different resource pools set to transmit the control information, the circuitry is configured to allocate a second resource pool as a part of a first resource pool in accordance with a situation of congestion of the first resource pool.

21. The terminal device according to claim 8, wherein, among a plurality of resource pools for different applications set to transmit the control information, the circuitry is configured to change an application of a second resource pool in accordance with a situation of congestion of a first resource pool.

22. The terminal device according to claim 8, wherein the circuitry is configured to restrict the allocation of the resources in accordance with a situation of congestion of a resource pool for allocating the resources.

23. A communication method comprising:
performing radio communication with a plurality of terminal devices;
acquiring location information of the plurality of terminal devices from the plurality of terminal devices, respectively;
allocating resources from a predetermined resource pool to at least one of the plurality of terminal devices in semi-persistent scheduling for communication performed between the plurality of terminal devices, the semi-persistent scheduling being set with respect to the resource pool in accordance with a prediction result of future locations of the terminal devices, the future locations of the terminal devices being predicted based on the acquired location information of current locations of the plurality of terminal devices, and moving speed of the terminal devices measured by each of the plurality of terminal devices; and
controlling a transmission terminal device of the plurality of terminal devices to transmit information regarding the allocation of the resources to a receiving terminal device of the plurality of terminal devices via the radio communication.

24. A communication method comprising:
performing radio communication with another terminal device;
allocating resources in semi-persistent scheduling from a predetermined resource pool for communication performed with the other terminal device, the semi-persistent scheduling being set with respect to the resource pool in accordance with a prediction result of future location of the terminal device, the future location of the terminal device being predicted based on location information of current location of the terminal device and moving speed of the terminal device measured by the terminal device; and
transmitting information regarding the allocation of the resources to the other terminal device via the radio communication.

* * * * *